US010941749B2

(12) United States Patent
Han

(10) Patent No.: US 10,941,749 B2
(45) Date of Patent: Mar. 9, 2021

(54) SPEED CONVERTER-CONTROLLED RIVER TURBINES

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 16/691,145

(22) Filed: Dec. 11, 2019

(65) Prior Publication Data

US 2020/0095974 A1 Mar. 26, 2020

Related U.S. Application Data

(63) Continuation-in-part of application No. 16/233,365, filed on Dec. 27, 2018, and a continuation-in-part of application No. 16/134,595, filed on Sep. 18, 2018, which is a continuation-in-part of application No. 15/883,927, filed on Jan. 30, 2018, now Pat. No. 10,670,116, which is a continuation-in-part of application No. 15/267,655, filed on Sep. 16, 2016,
(Continued)

(51) Int. Cl.
| *F03B 15/00* | (2006.01) |
| *F16H 3/44* | (2006.01) |
| *F03B 13/10* | (2006.01) |
| *F03B 7/00* | (2006.01) |

(52) U.S. Cl.
CPC .............. *F03B 15/00* (2013.01); *F03B 7/00* (2013.01); *F03B 13/10* (2013.01); *F16H 3/44* (2013.01)

(58) Field of Classification Search
CPC .. F03B 15/00; F03B 13/10; F03B 7/00; F03B 2260/4031; F03B 13/26; F16H 3/44; F16H 3/724
USPC ................... 290/42, 43, 44, 53, 54, 55
See application file for complete search history.

(56) References Cited

U.S. PATENT DOCUMENTS

| 2,503,832 A | * | 4/1950 | McCune | ............... A63H 33/30 446/166 |
| 3,382,386 A | * | 5/1968 | Schlaeppi | ............ H02K 49/102 310/104 |

(Continued)

FOREIGN PATENT DOCUMENTS

| WO | WO2011/011358 A2 | 1/2011 | |
| WO | WO-2017220995 A1 * | 12/2017 | ................ F03B 7/00 |

*Primary Examiner* — Charles Reid, Jr.
(74) *Attorney, Agent, or Firm* — Cameron LLP

(57) ABSTRACT

A river turbine for harnessing a predetermined minimum or baseload value of hydrokinetic energy from river current received at a harnessing module has three modules: the harnessing module, a controlling module and a generating module. Han's principle is that, in a torque balanced speed converter Hummingbird system, the generated electric power (output) from a harnessed input power (input) must exceed the electric power used for the control motor (control). Harnessed power is provided to the power balanced three variable mechanical control system when a control power line graph is crossed by an output power line graph to achieve an electrical advantage. The three variable mechanical motion control system includes a Hummingbird control assembly of first and second spur/helical gear, first and second ring gear and first and second bevel/miter gear Transgear gear assemblies.

11 Claims, 21 Drawing Sheets

Perspective View
Basic Spur Gear Transgear

Related U.S. Application Data now Pat. No. 9,912,209, which is a continuation-in-part of application No. 14/838,867, filed on Aug. 28, 2015, now Pat. No. 9,476,401, said application No. 16/134,595 is a continuation-in-part of application No. 15/707,138, filed on Sep. 18, 2017, now Pat. No. 10,378,506.

(60) Provisional application No. 62/409,549, filed on Oct. 18, 2016, provisional application No. 62/487,101, filed on Apr. 19, 2017, provisional application No. 62/520,884, filed on Jun. 16, 2017, provisional application No. 62/779,683, filed on Dec. 14, 2018.

(56) References Cited

U.S. PATENT DOCUMENTS

| | | | | |
|---|---|---|---|---|
| 3,984,698 A * | 10/1976 | Brewer | ................... | F03B 7/003 290/54 |
| 4,956,762 A * | 9/1990 | Loveness | ................ | H02M 7/72 307/82 |
| 5,440,175 A * | 8/1995 | Mayo, Jr. | ................ | F03B 7/003 290/53 |
| 5,476,293 A * | 12/1995 | Yang | ......................... | F03D 7/02 290/4 C |
| 6,208,037 B1 * | 3/2001 | Mayo, Jr. | .................. | E02B 9/00 290/42 |
| 7,375,437 B2 * | 5/2008 | Peckham | .............. | F03B 17/063 290/43 |
| 8,120,196 B1 * | 2/2012 | Neese | ................... | F03B 13/183 290/53 |
| 8,388,481 B2 | 3/2013 | Han | | |
| 8,485,933 B2 * | 7/2013 | Han | ......................... | F03B 3/18 475/205 |
| 8,593,005 B2 * | 11/2013 | Drews | ....................... | F03B 7/00 290/43 |
| 8,641,570 B2 | 2/2014 | Han | | |
| 8,702,552 B2 | 4/2014 | Han | | |
| 2005/0017513 A1 * | 1/2005 | Sipp | ...................... | F03B 17/063 290/54 |
| 2006/0131890 A1 * | 6/2006 | Gizara | .................. | F03B 17/065 290/43 |
| 2009/0126612 A1 * | 5/2009 | Williams | ................ | B63B 35/44 114/61.2 |
| 2010/0045039 A1 * | 2/2010 | Stroup | .................. | F03D 3/0418 290/44 |
| 2010/0237625 A1 * | 9/2010 | Dempster | ................ | F03B 7/00 290/54 |
| 2010/0237626 A1 * | 9/2010 | Hamner | ................ | F03B 17/065 290/54 |
| 2010/0301609 A1 * | 12/2010 | Kim | ....................... | F03B 17/065 290/54 |
| 2011/0173976 A1 * | 7/2011 | Meadon | .................. | F03B 7/003 60/639 |
| 2012/0032451 A1 * | 2/2012 | Heitmann | ................. | F03B 7/00 290/1 D |
| 2012/0098266 A1 * | 4/2012 | Fransen | ................ | F03B 17/062 290/54 |
| 2012/0119501 A1 * | 5/2012 | Yeomans | ............... | F03B 13/264 290/54 |
| 2012/0139251 A1 * | 6/2012 | Pai | ........................ | F03B 17/067 290/54 |
| 2012/0299301 A1 * | 11/2012 | Han | ......................... | F03B 3/18 290/52 |
| 2012/0299304 A1 * | 11/2012 | Al-Saffar | ............. | F03B 17/005 290/54 |
| 2013/0026762 A1 * | 1/2013 | Rajadhyaksha | ........ | F03B 17/063 290/54 |
| 2013/0229014 A1 * | 9/2013 | Willingham | .............. | F03B 7/00 290/54 |
| 2013/0313833 A1 * | 11/2013 | Bang | ..................... | F03B 17/063 290/54 |
| 2014/0159366 A1 * | 6/2014 | Figueroa Nunez | ... | F03B 17/063 290/43 |
| 2014/0241855 A1 * | 8/2014 | Han | ........................ | F03B 15/12 415/60 |
| 2015/0159620 A1 * | 6/2015 | Widmer | ................ | F03B 17/063 290/54 |
| 2015/0252774 A1 * | 9/2015 | Shimizu | ................ | F03B 17/065 416/7 |
| 2016/0084217 A1 * | 3/2016 | Huebner | ................ | F03B 7/003 290/54 |
| 2018/0195582 A1 | 7/2018 | Han | | |
| 2019/0360455 A1 * | 11/2019 | Youssef | ................ | F03B 17/063 |

\* cited by examiner

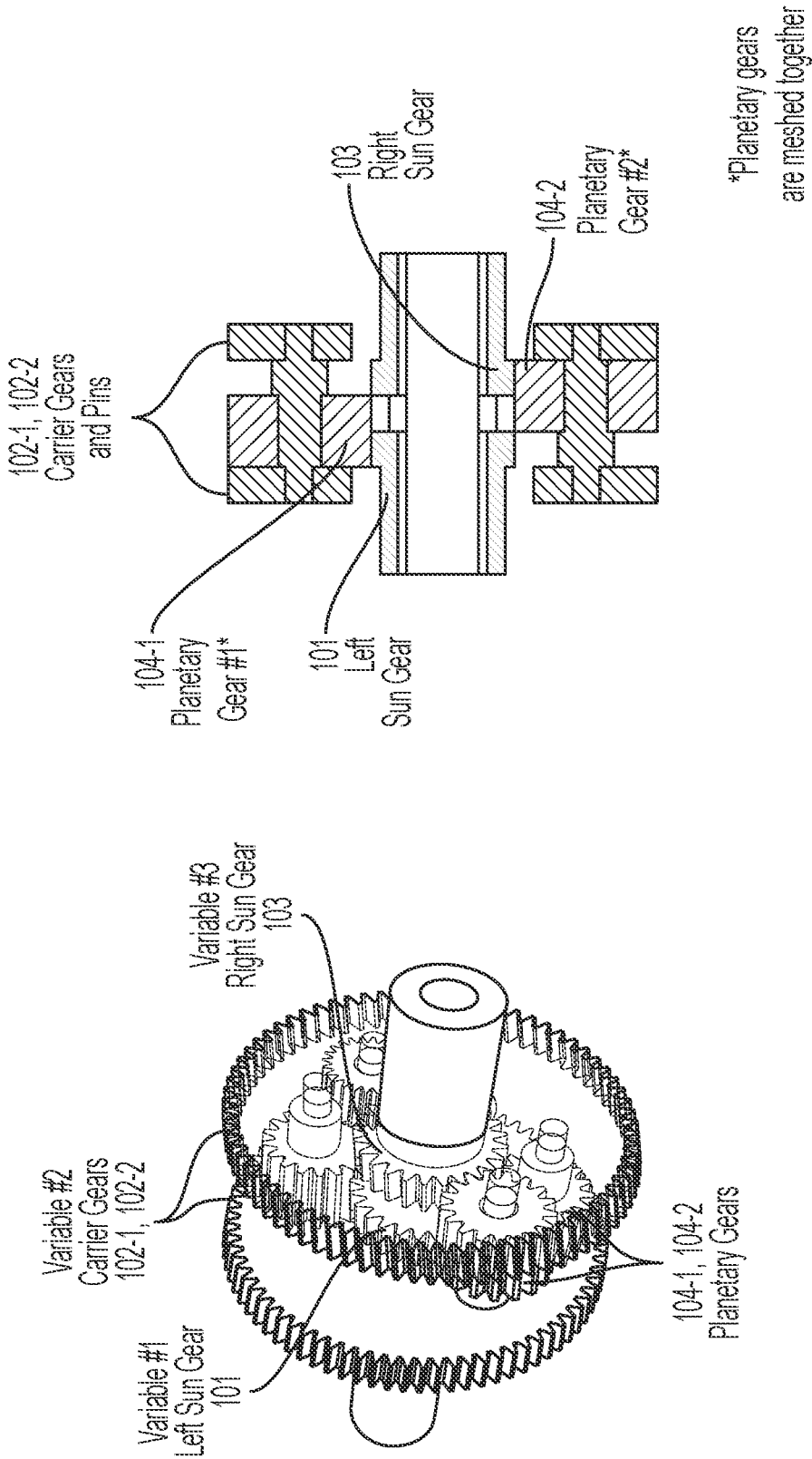
Figure 1A and 1B Basic Spur Gear Transgear

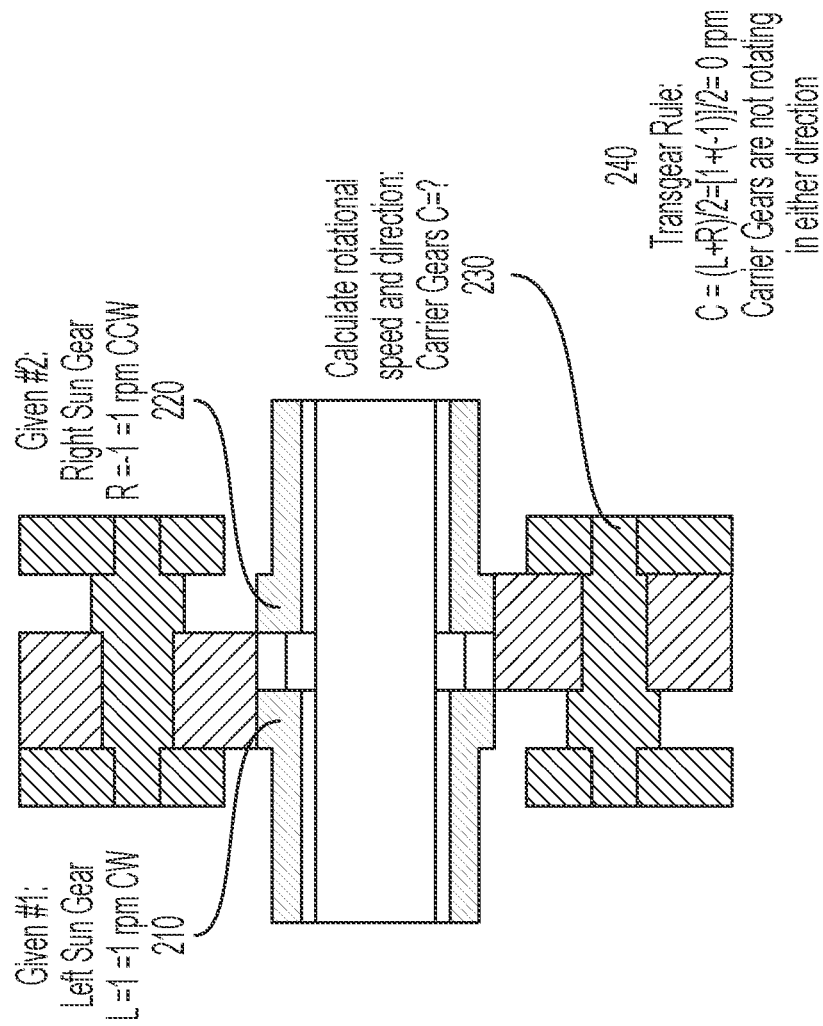
Figure 2: Calculation of the third variable with two known variables

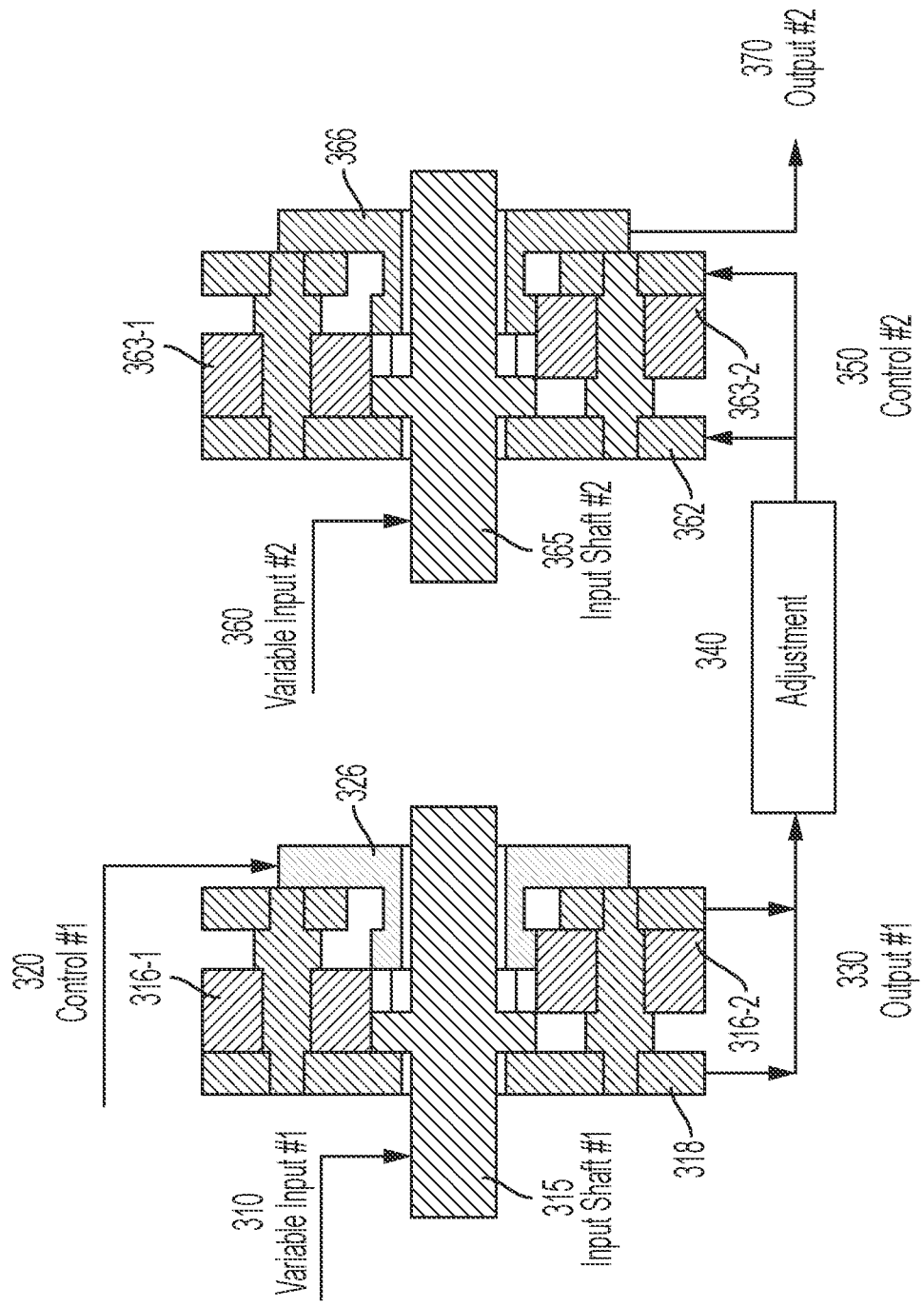
Figure 3: General Configuration of Speed Converter Hummingbird

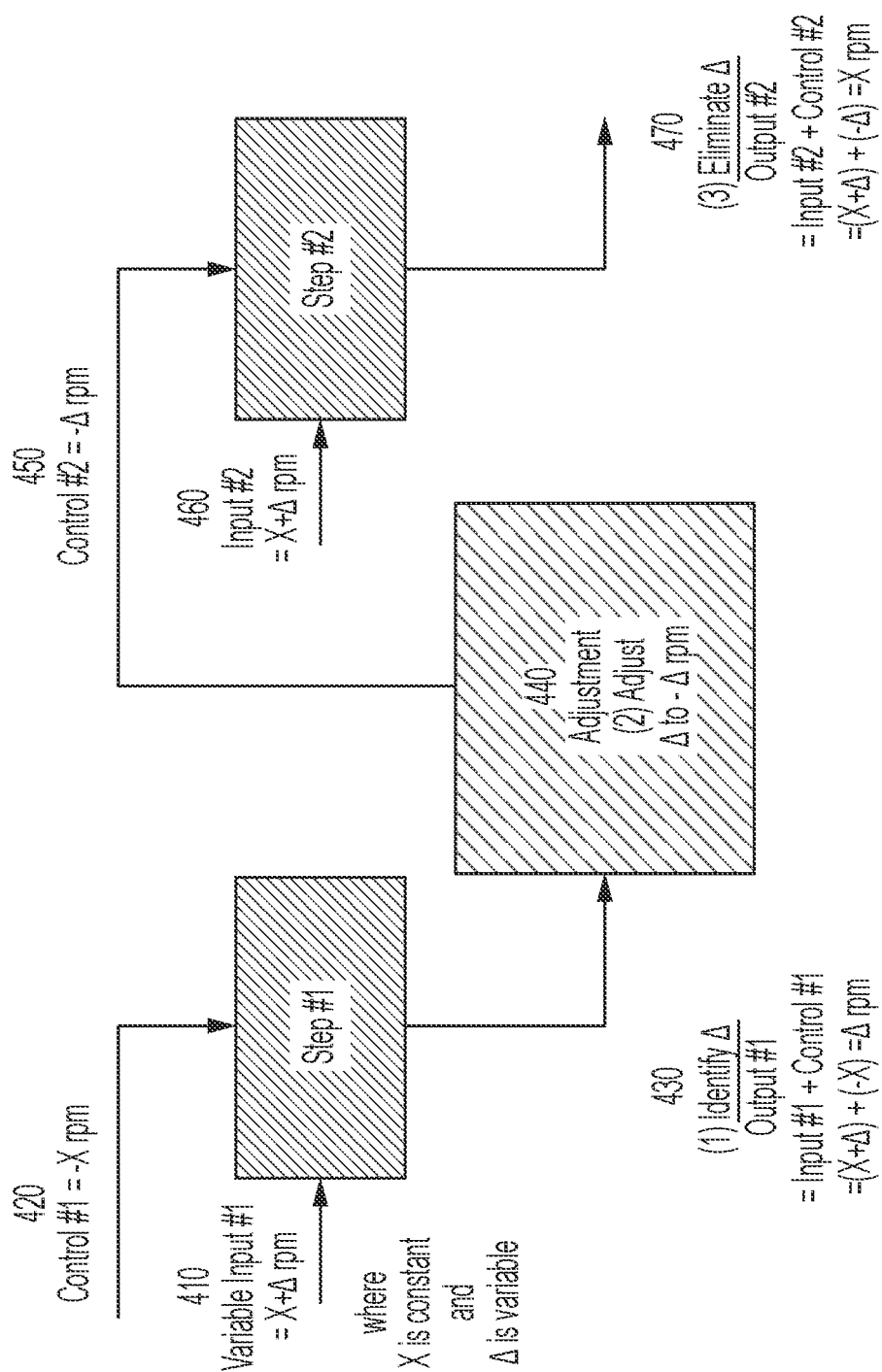
Figure 4: Algorithm of Three Step Speed Conversion

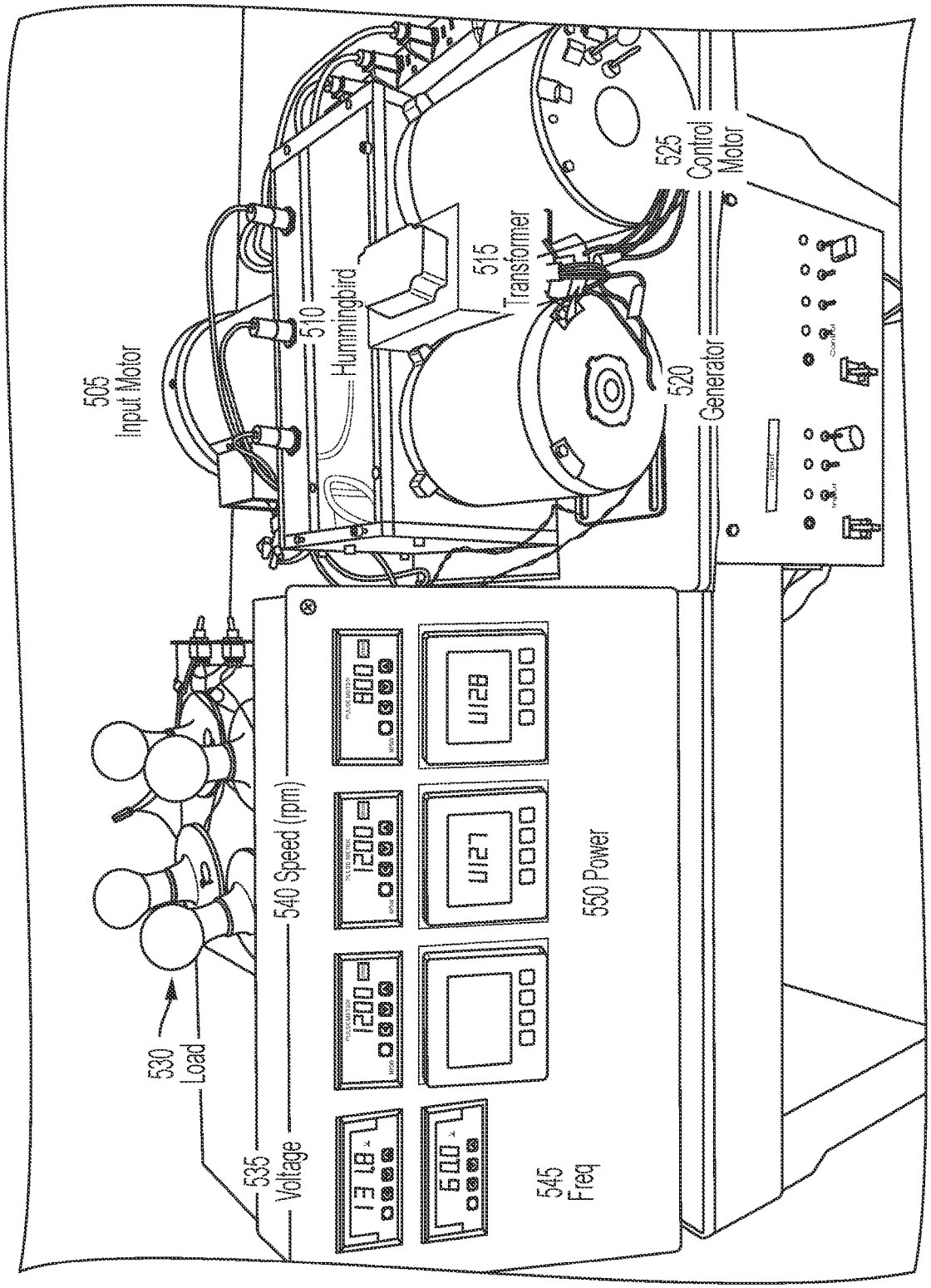
Figure 5A: Test Structure of Hummingbird #4B, Load Meters

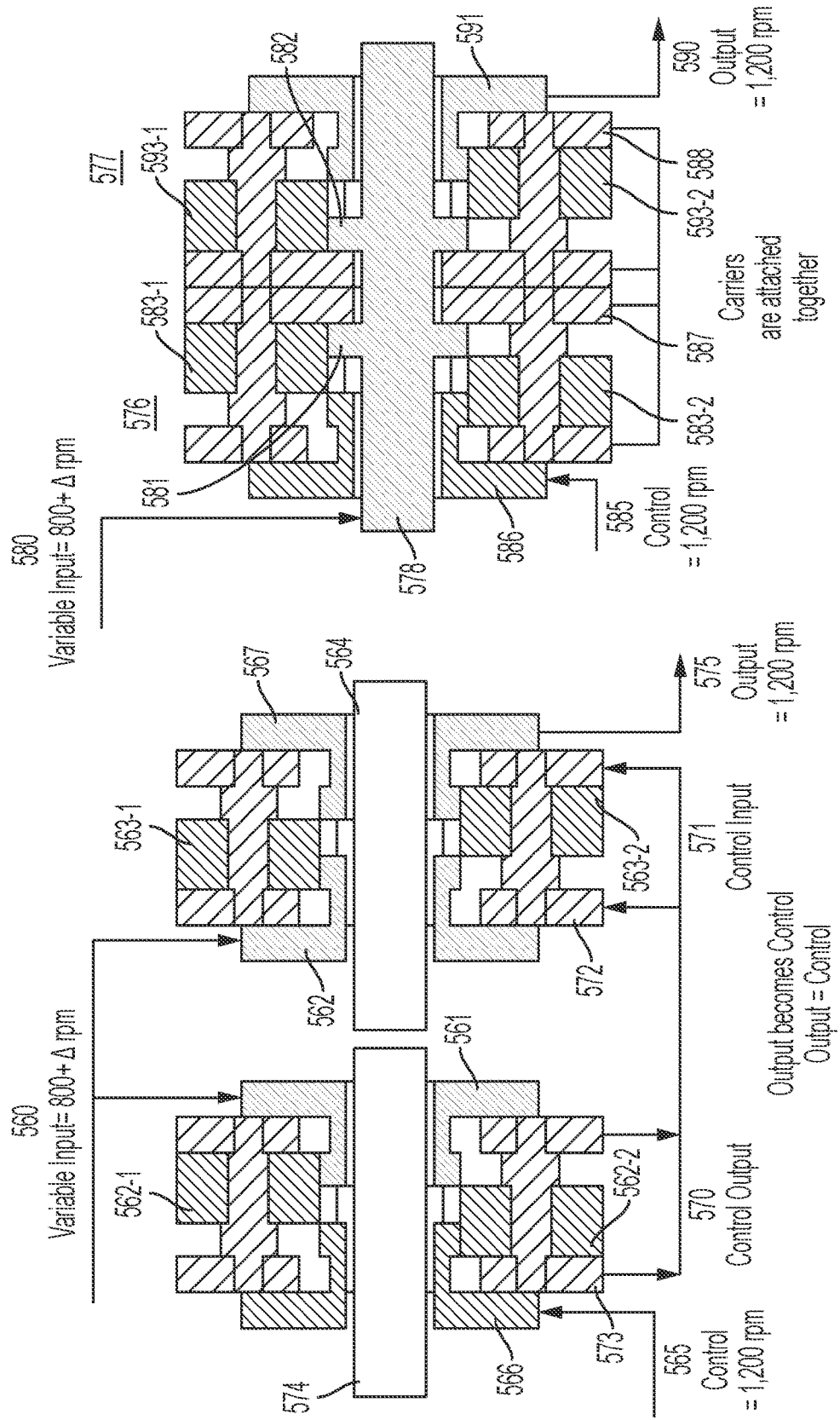
Figure 5B: Configuration of #4B    Figure 5C: Diagram of #4B
Figure 5B and 5C: Configuration and Diagram of Hummingbird #4B 502 Test Procedure:
  a. Load: 0 watt
  b. Input Motor rpm: 800 ~ 1,600 rpm
  c. Control Motor rpm: 1,200 rpm
  d. Read Frequency
  e. Increase Load and Read Frequency (Repeat)

| 504 Load | 506 Frequency | 505 Input Motor 1.00 hp | 525 Control Motor 0.13 hp | 520 Generator Max Load 0.50 hp | 514 Frequency |
|---|---|---|---|---|---|
| Watts | Hz | rpm | rpm | rpm | Hz |
| 0 | Adjustment to 60 Hz | 800 - 1,600 | 1,200 | 1,200 | 60.0 |
| 60 | No Adjustment | 800 - 1,600 | 1,196 | 1,196 | 59.7 |
| 120 | No Adjustment | 800 - 1,600 | 1,191 | 1,191 | 59.5 |
| 180 | No Adjustment | 800 - 1,600 | 1,184 | 1,184 | 59.2 |

516 observation #1: When the load is zero, if the control is 1,200 rpm, frequency is 60 Hz.
518 observation #2: When the load is increases, frequency decreases.

Figure 5D: Test-1 of Hummingbird #4B

522 Test Procedure:
 a. Load: 0 watt
 b. Input Motor rpm: 800 ~ 1,600 rpm
 c. Adjust Control Motor speed: 1,200 rpm
 d. Read Frequency
 e. Increase Load, Adjust Control Motor rpm, and Read Frequency (Repeat)

| 524 | 526 | 505 Input Motor 1.00 hp | 525 Control Motor 0.13 hp | 520 Generator Max Load 0.50 hp | 534 |
|---|---|---|---|---|---|
| Load | Frequency | | | | Frequency |
| Watts | Hz | rpm | rpm | rpm | Hz |
| 0 | Adjustment to 60 Hz | 800 - 1,600 | 1,200 | 1,200 | 60.0 |
| 60 | Adjustment to 60 Hz | 800 - 1,600 | 1,200 | 1,200 | 60.0 |
| 120 | Adjustment to 60 Hz | 800 - 1,600 | 1,200 | 1,200 | 60.0 |
| 180 | Adjustment to 60 Hz | 800 - 1,600 | 1,200 | 1,200 | 60.0 |

536 Observation #3: If the control speed is adjusted to 1,200 rpm, frequency is 60.0 Hz.

Figure 5E: Test-2 of Hummingbird #4B

Figure 6A: Test structure of Hummingbird #4D, Variable Load and Meters, Efficiency

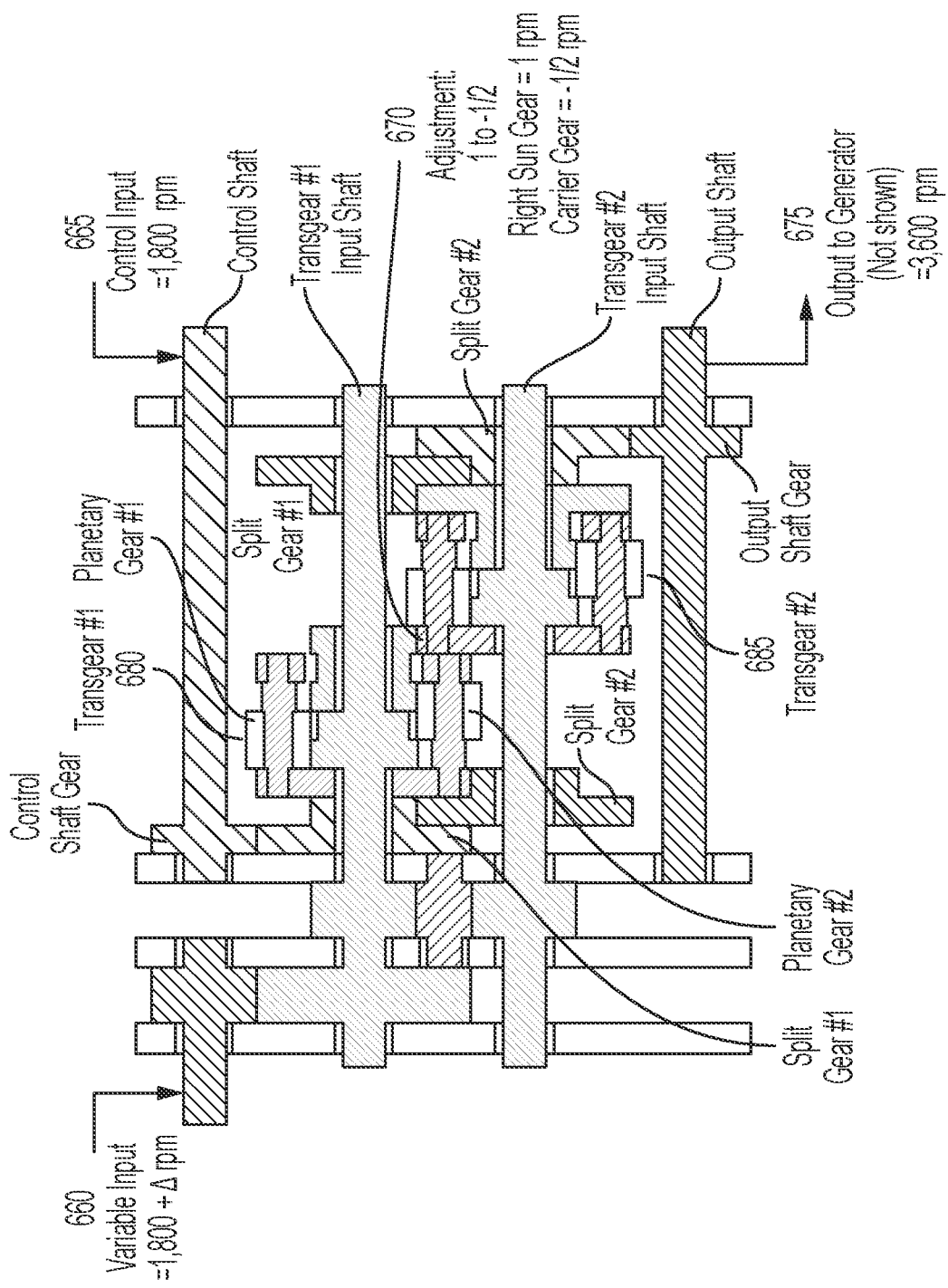
Figure 6B: Diagram and Designed Speed of Hummingbird #4D

602 Test Procedure: Load Increased
 a. Load: 0 watt
 b. Input Motor rpm: 1,800 rpm + Δ rpm
 c. Adjust Control Motor Speed ~1,800 rpm to produce 60 Hz
 d. Record load, speeds, torques, powers, frequency, and voltage
 e. Increase Load and record the same 604 Data #16H: 190409-1350

| 606 Load | | 608 Speed rpm | | | 612 Torque Nm | | | 614 Power kW | | | 616 Freq | 618 Volt | 622 |
| --- | --- | --- | --- | --- | --- | --- | --- | --- | --- | --- | --- | --- | --- |
| 606A W | 606B ΣW | 608A Input | 608B Ctrl | 608C Output | 612A Input | 612B Ctrl | 612C Output | 614A Input | 614B Ctrl | 614C Output | Hz | VAC | PR* |
| 0 | 0 | 2012 | 1782 | 3564 | 0.96 | 2.16 | 0.68 | 0.393 | 0.279 | 0 | 60.3 | 119.7 | --- |
| 295 | 295 | 2010 | 1768 | 3537 | 1.49 | 3.89 | 1.49 | 0.510 | 0.435 | 0.284 | 59.9 | 116.7 | 1.53 |
| 295 | 590 | 2009 | 1755 | 3511 | 2.16 | 5.50 | 2.27 | 0.659 | 0.592 | 0.560 | 59.5 | 114.0 | 1.05 |
| 285 | 885 | 2005 | 1740 | 3482 | 3.08 | 7.12 | 3.00 | 0.858 | 0.733 | 0.809 | 59.0 | 111.4 | 0.90 |
| 180 | 1065 | 2004 | 1733 | 3468 | 3.64 | 7.91 | 3.47 | 1.007 | 0.824 | 0.955 | 58.7 | 109.5 | 0.86 |
| 180 | 1245 | 2002 | 1722 | 3449 | 4.30 | 8.82 | 3.89 | 1.182 | 0.920 | 1.089 | 58.4 | 107.3 | 0.84 |
| 69 | 1314 | 1999 | 1718 | 3436 | 4.93 | 9.21 | 4.05 | 1.317 | 0.950 | 1.133 | 58.2 | 106.5 | 0.83 |

624 Direction viewed from Left. Direction: (REV) Input CCW, Control CCW, and Output CW.
(FWD) Input CW, Control CCW, and Output CCW.
Load: Rated/Measure=60/39, 100/69, 200/180, 300/295. Warmed up.
*PR (Calculated Power Ratio) = Control Power / Output Power.

Figure 6C: Test Data #16H of Hummingbird #4D

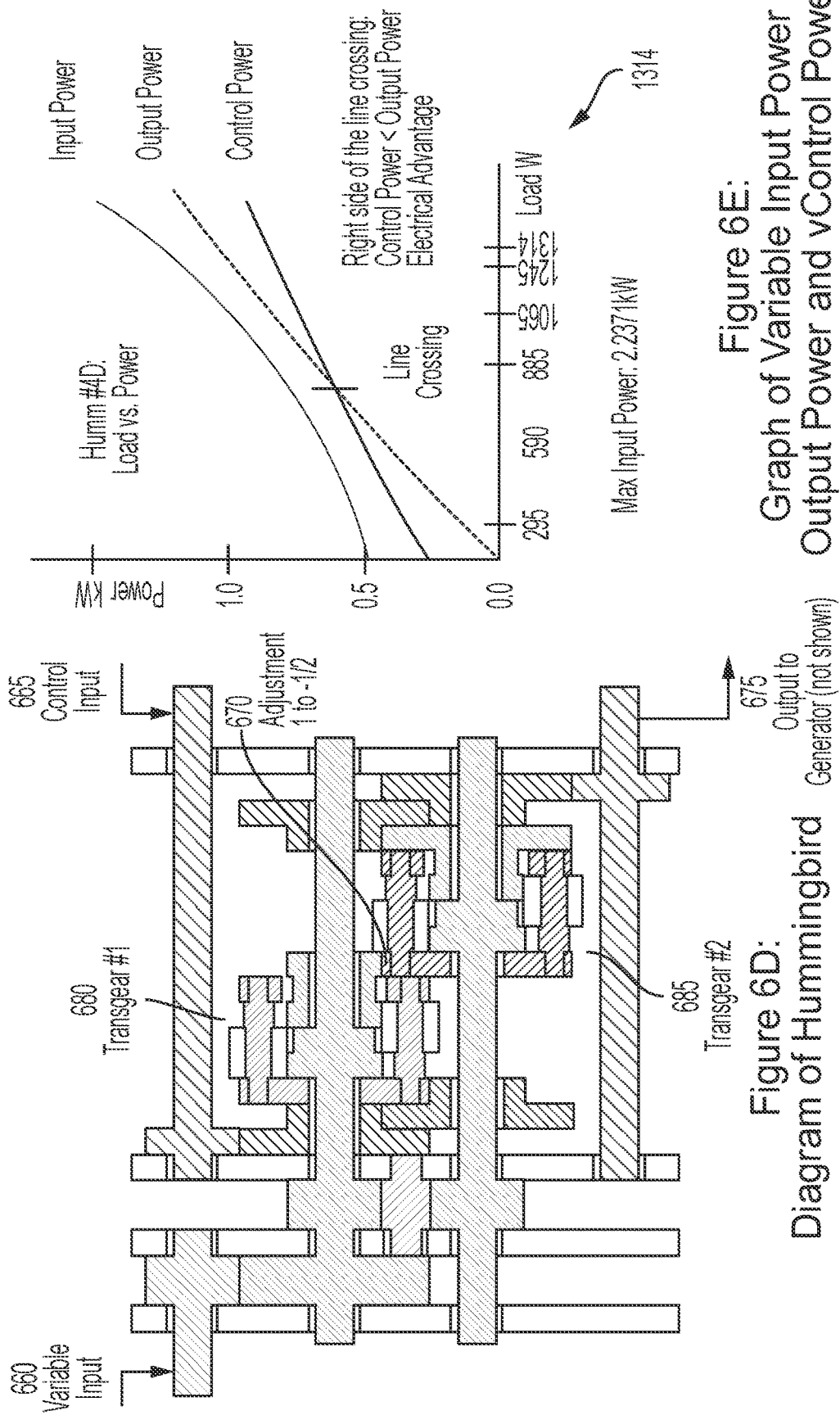
Figure 6D and 6E: Diagram of Hummingbird #4D and Graph of Input Output and Control Power

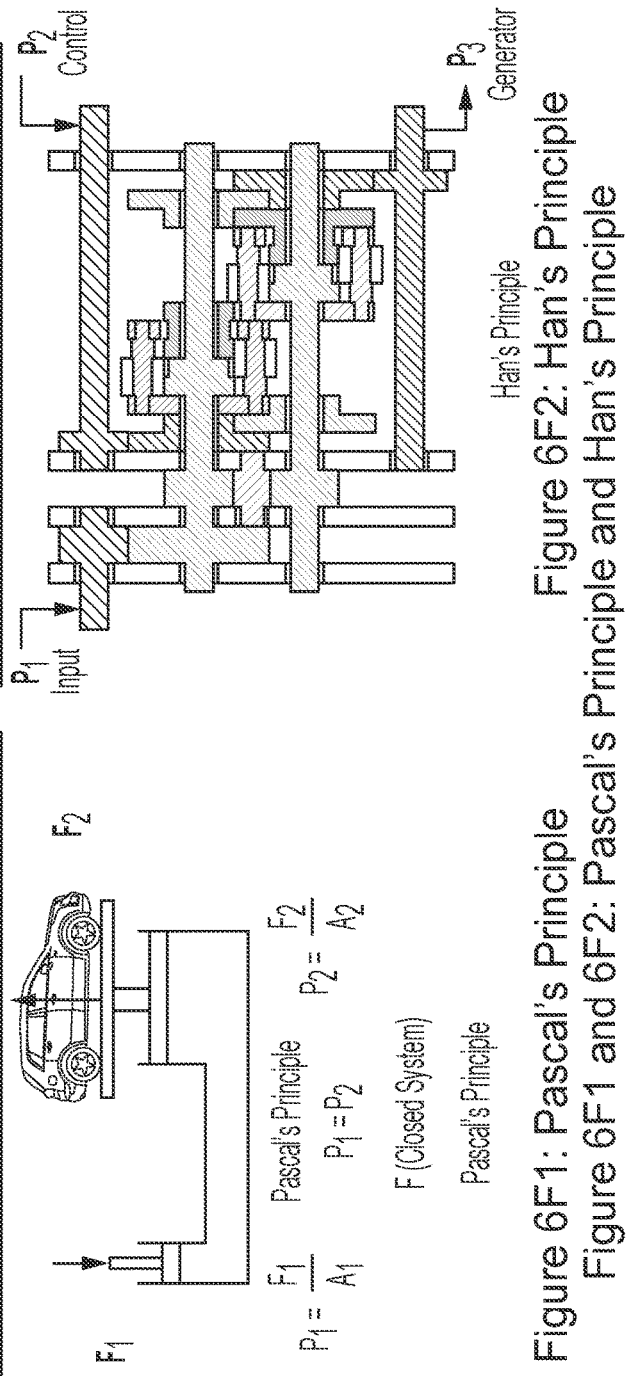
Figure 6F1: Pascal's Principle
Figure 6F2: Han's Principle
Figure 6F1 and 6F2: Pascal's Principle and Han's Principle

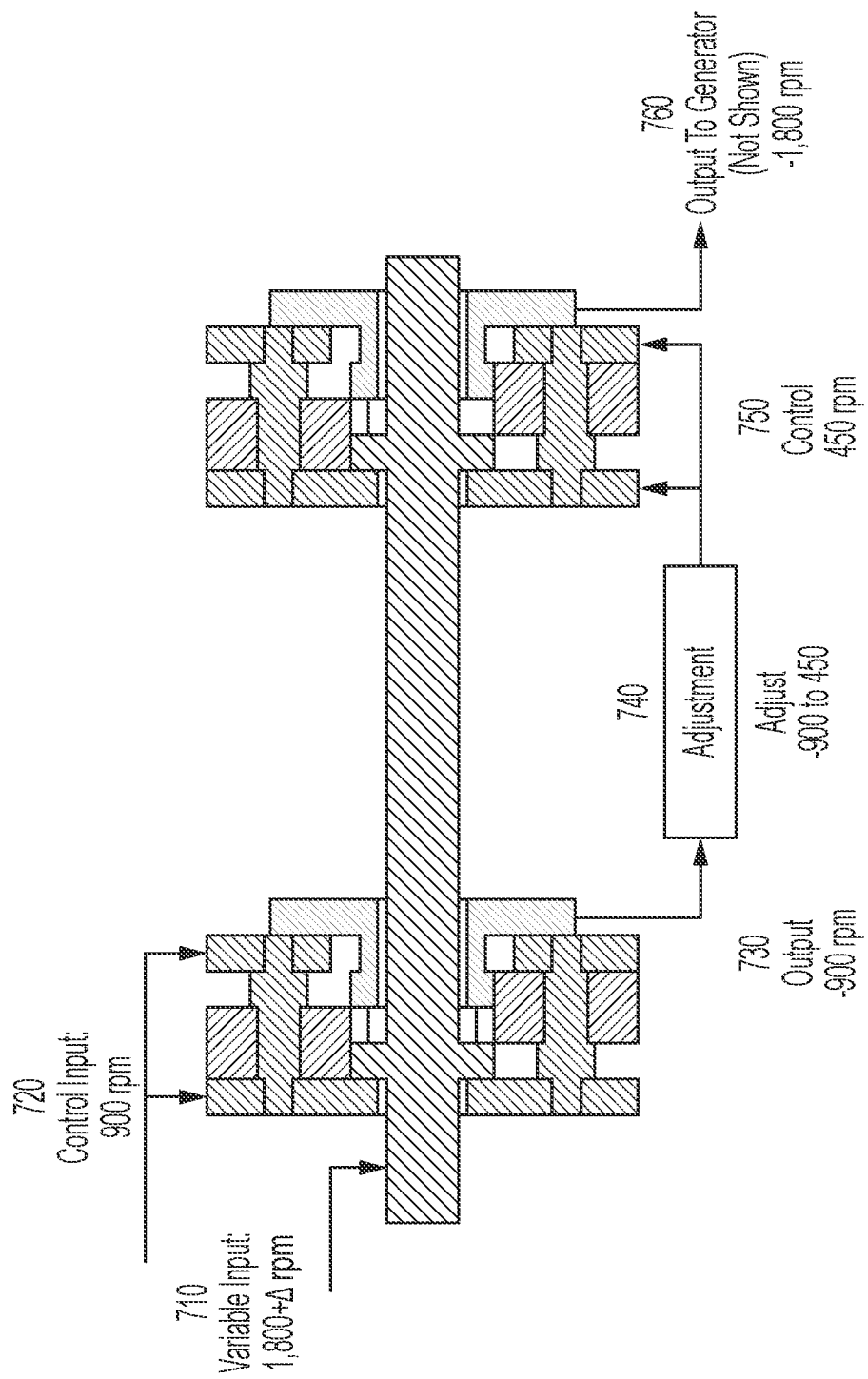
Figure 7A: Configuration of Hummingbird for Three Step Speed Conversion

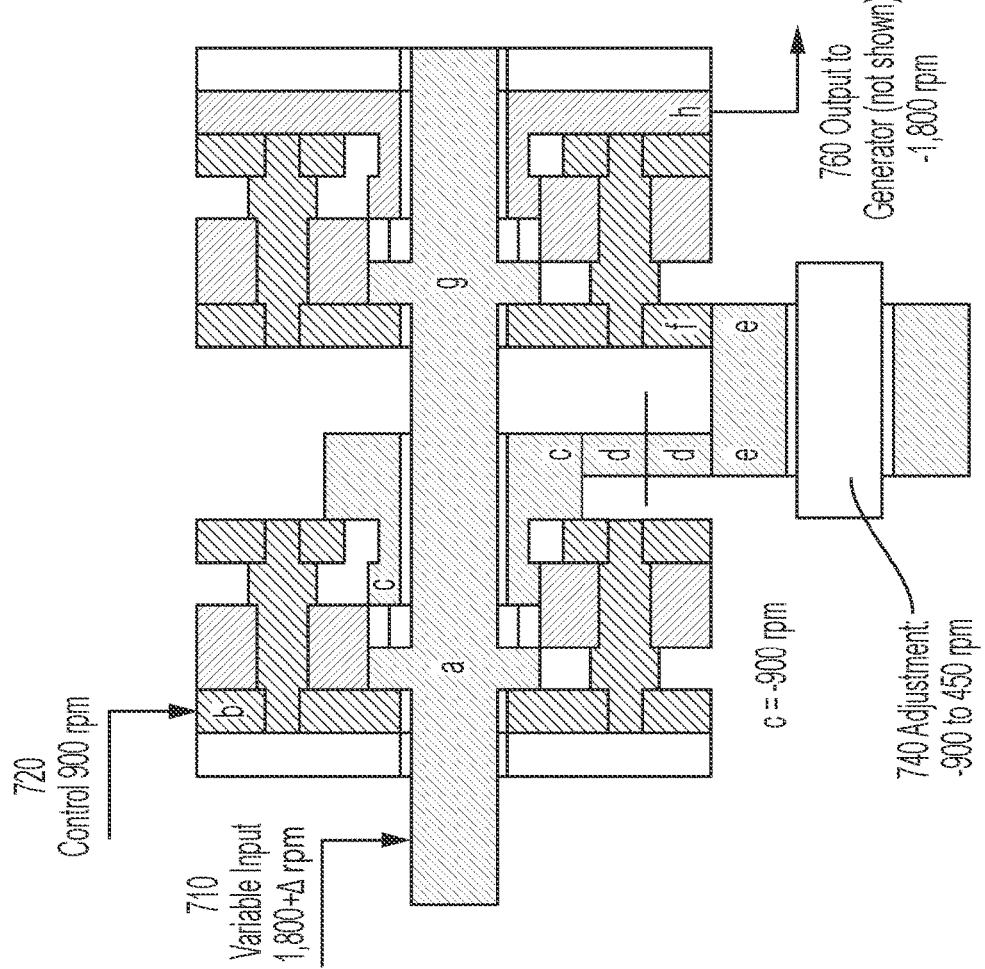
Figure 7B1 and 7B2: Diagram of Hummingbird for Three Step Speed Conversion

| | Description | | Variable Input = 1,800 ~ 3,600 (=2×1,800) rpm | |
|---|---|---|---|---|
| a | Variable Input = X+Δ rpm | 1,800 = 1,800 + 0 | 2,700 = 1,800 + 900 | 3,600 = 1,800 + 1,800 |
| b | Control = X/2 | 1,800/2 = 900 | 1,800/2 = 900 | 1,800/2 = 900 |
| c | c = 2b-a = 2(X/2)-(X+Δ) = -Δ<br>"-Δ" Identified | 2(900) - 1,800<br>= 0 | 2b-a = 2(900) -2,700<br>= -900 | 2(900) -3,600<br>= -1,800 |
| d | d = -c | 0 | 900 | 1,800 |
| e | e = -d | -0 | -900 | -1,800 |
| f | f = -(1/2)e<br>"-Δ" Adjusted to "Δ/2" | -(1/2)(-0)<br>= 0 | -(1/2)(-900)<br>= 450 | -(1/2)(-1,800)<br>= 900 |
| g | Variable Input = X+Δ rpm | 1,800 + 0 | 1,800 + 900 | 1,800 + 1,800 |
| h | Output h=2f-g<br>=2[-(1/2)e] - (X+Δ) = -X<br>"Δ" Eliminated (Δ = -0) | 2(0)<br>- (1,800 + 0)<br>= -1,800 - 0 | 2(450)<br>- (1,800 + 900)<br>= -1,800 - 0 | 2(900)<br>- (1,800 + 1,800)<br>= -1,800 - 0 |

Transgear Rule: C=(L+R)/2 → R=2C-L → "c=2b-a" and "h=2f-g"

Figure 7C: Understanding of Three Step Speed Conversion Process

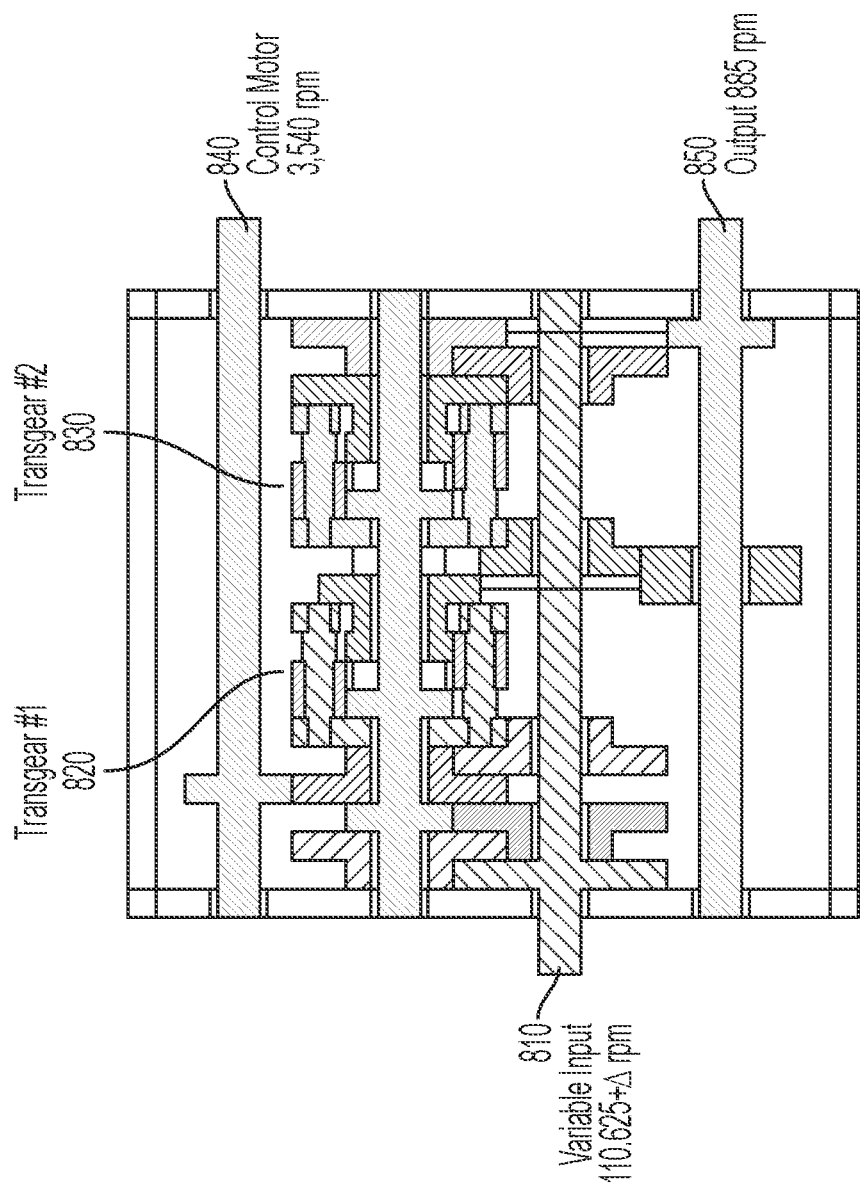
Figure 8: Case Study #1 with Spur Gear Transgear Hummingbird #4D5

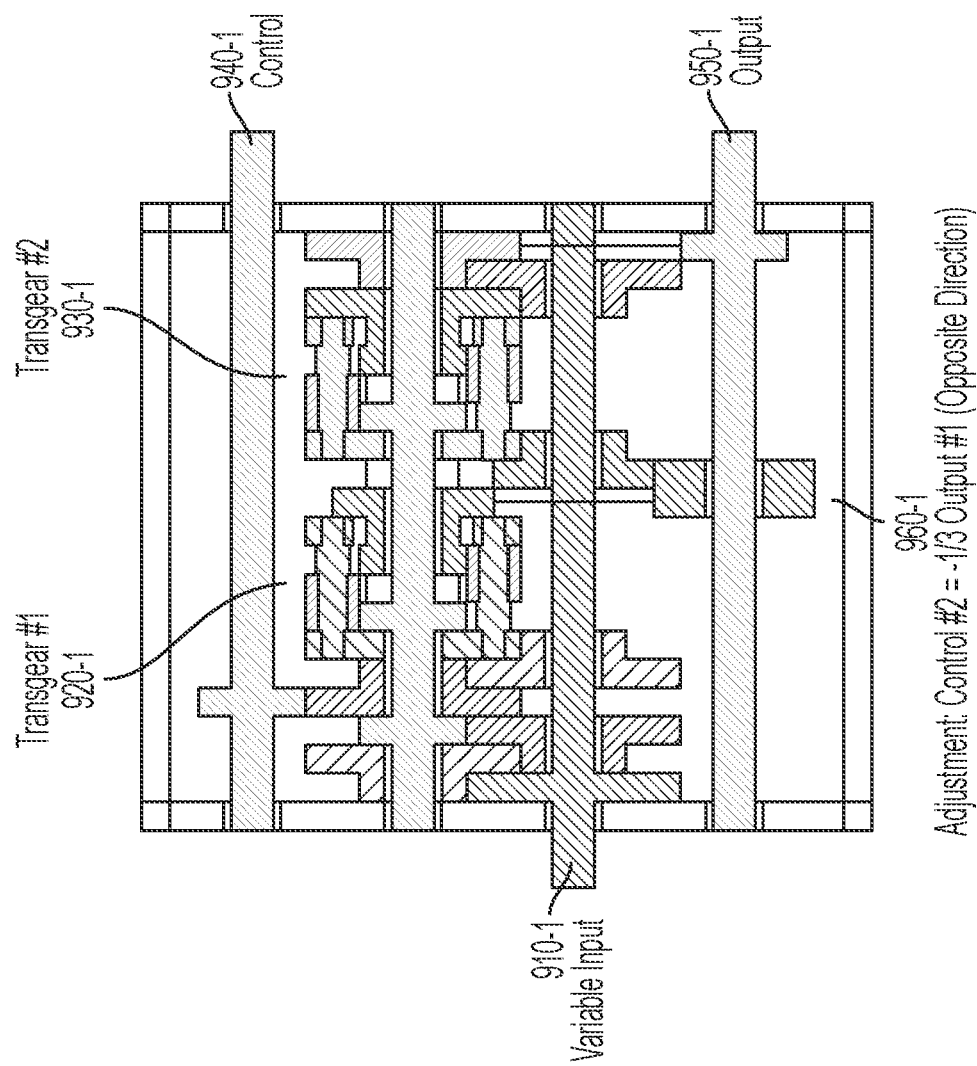
Figure 9A: Basic Spur Gear Transgears

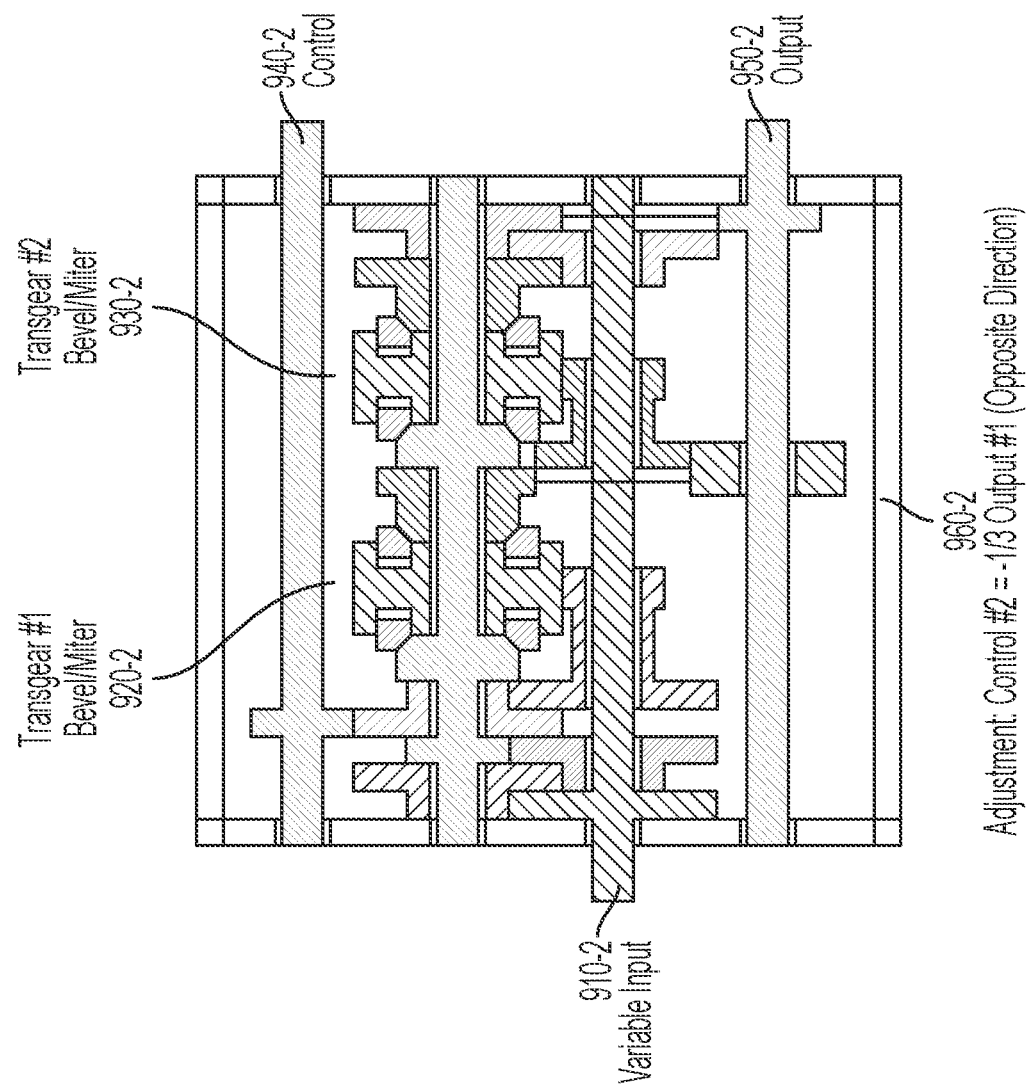
Fig 9B: Bevel/Miter Gear Transgears

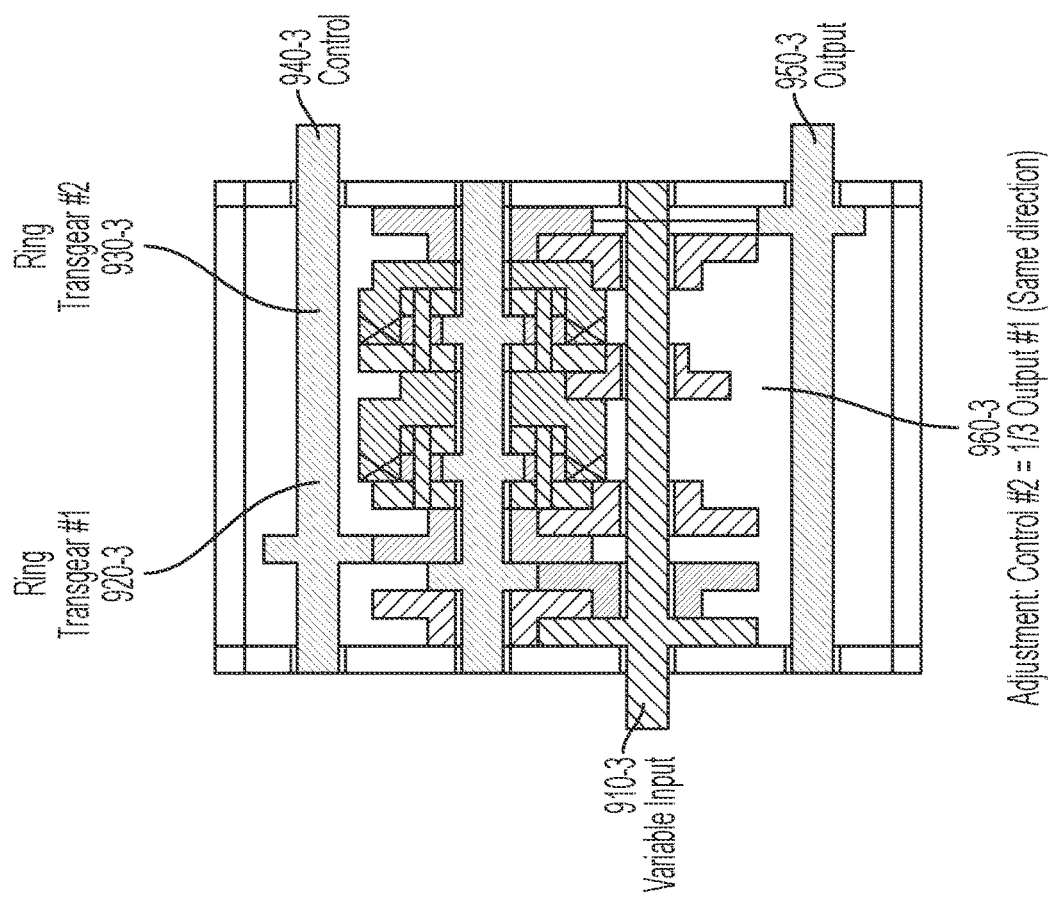
Fig 9C: Ring Gear Transgears

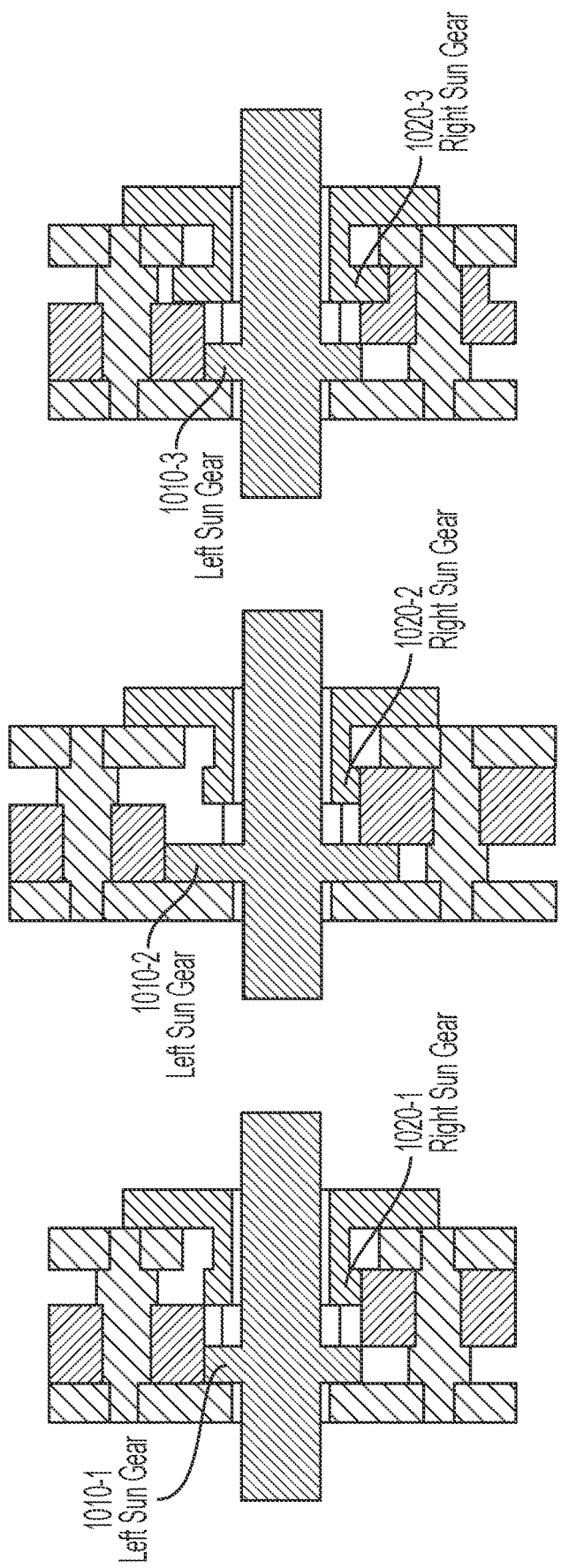

SPEED CONVERTER-CONTROLLED RIVER TURBINES

This application is a continuation-in-part of U.S. patent application Ser. No. 16/235,365 filed Dec. 27, 2018 which is a continuation-in-part of U.S. patent application Ser. No. 16/134,595 filed Sep. 18, 2018 which is a continuation-in-part of U.S. patent application Ser. No. 15/883,927 filed Jan. 30, 2018, which is a continuation-in-part of U.S. patent application Ser. No. 15/267,655, filed Sep. 16, 2016, (now U.S. Pat. No. 9,912,209) which is a continuation-in-part of U.S. patent application Ser. No. 14/838,867 (now U.S. Pat. No. 9,476,401) filed on Aug. 28, 2015, and U.S. patent application Ser. No. 16/134,595 is also a continuation-in-part of U.S. patent application Ser. No. 15/707,138 filed on Sep. 18, 2017, entitled "Commutator-less and Brush-less Direct Current Generator and Applications for Generating Power to an Electric Power System," now U.S. Pat. No. 10,378,506 issued Aug. 13, 2019, which claims the right of priority to U.S. Provisional Patent Application Ser. No. 62/409,549 filed Oct. 18, 2016 of the same title and inventor, and U.S. patent application Ser. No. 15/883,927 claims the benefit of priority to U.S. Provisional Patent Application Ser. No. 62/487,101 filed Apr. 19, 2017 and to U.S. Provisional Patent Application Ser. No. 62/520,884 filed Jun. 16, 2017, and this application claims the right of priority to U.S. Provisional Patent Application Ser. No. 62/779,683 filed Dec. 14, 2018 and to U.S. Provisional Patent Application Ser. No. 62/890,277 filed Aug. 22, 2019; all patent applications of the same inventor and incorporated by reference in their entirety.

TECHNICAL FIELD

The technical field of the invention relates to providing a method and apparatus for controlling the harnessing of renewable energy to a constant power value and constant frequency with a marine hydrokinetic (MHK) river or tidal turbine by balancing torque and rotational speed, or other renewable energy producing source (for example, wind) and for controlling other apparatus. The turbine comprises three components: a harnessing module, a controlling module and a generating module. Two units of three variable Transgear™ gear assemblies arc assembled in various configurations as a so-called Hummingbird™ controlling module, for example, such that two spur/helical gear. Transgear gear assemblies (a bevel/miter gear or a ring gear/spur gear assembly Hummingbird controlling module) having an input, an output, and a control comprising a control motor for converting variable renewable input energy (particularly river and tidal water energy) into renewable energy having a constant rotational speed output, constant voltage and constant current for generating an electrical output of constant frequency (fifty Hertz European or sixty Hertz U.S.), for example, at fifty kilowatts. The river or tidal turbine may be used in river or tidal estuary applications having a harnessing module designed for a particular location on the river or tidal estuary sufficient to supply at least fifty kW of power to an electric grid or for local distribution.

BACKGROUND OF THE INVENTION

Hydroelectric and wind energy are two major sources of so-called renewable energy. In the U.S.A. in 2015 according to the U.S. Energy Information Administration (EIA), 33.3% or one-third of all electric energy is produced by steam generation using coal. A third source of renewable energy comes from the sun (only 0.6%) and a first source comes from water (hydro amounts to 6.0% according to the EIA). Water flows at variable speed and so does wind. The sun only is bright enough during daytime hours for conversion to electrical energy. An advantage of water flow is the mass/density, inertia or power that may be generated by the flow of water compared with the flow of wind (wind amounts to 4.7%) where wind must be harnessed by large wind-driven propellers or rotor blades. Also, for example, river water typically flows at all hours of the day at a relatively constant rate of flow.

Natural gas provides, in the same year, about 32.8% of U.S. electric energy, and nuclear energy now provides about 19.6%, for example, via steam turbine generation. Petroleum, such as oil, is used to produce only about 1% of U.S. electric energy. Coal, natural gas, biomass (1.6%) and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic, MHK, energy via river or tidal turbine) sources. The Grand Coulee dam, Hoover dam and the Tennessee Valley Authority are exemplary of projects started in the early $20^{th}$ century in the United States for generating hydroelectric power, but these require large darns to build potential energy for turning electric turbine generators. Large hydroelectric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a water driven electricity generator and control that may save the cost of building a darn, permit the marine hydrokinetic (MHK) generation of electricity and use the high inertia flow of a river or tidal estuary flow of ocean currents and tides to produce constant power. And, notwithstanding the variable nature of renewable sources of energy, there is a need for a control system for assuring constant power at constant frequency, voltage and current so as to be a dependable source for small villages, for example, in developing nations of Africa and other continents and to conform to world standards.

So-called biomass energy generated from plant and animal material (waste) may amount to 1.6% of total renewable energy but has similar problems to those of non-renewable carbon-based systems and can cause emissions. While hydroelectric energy amounts to the next greatest renewable source at about 6.0%, it is believed that more can be done to efficiently utilize the rivers and tides of ocean currents in the United States and in developing nations, for example, in Africa than by hindering the flow of water commerce by the construction of dams.

Other renewable sources include geothermal, wind and solar energy. While these are "clean" sources, to date, their growth has been unimpressive. Only wind energy is supported by the Department of Energy, and wind energy is forecast to grow from 4.7% in 2015 to 20% of all US energy in approximately 20 years. Recently, offshore wind turbines have been considered for use off the Eastern Shore of the United States mounted on platforms for generating power for the mainland coastal states.

A mechanical meshed gear gearbox is known to have a failure rate of approximately 5%. Electronics used in a turbine have the highest potential failure rate of 26%. Control units generally exhibit a failure rate of 11%. Sensors exhibit approximately a 10% failure rate. The failure rate of a variable frequency converter or variable power converter may be on the order of 26% (electronics) according to an ongoing consortium's study of drive train dynamics at the University of Strathclyde, Glasgow, Scotland. According to published information, the mean time between failures of a 1.5 megawatt turbine, for example, may be only two years on average (but the real failure rate is an industrial secret); and the replacement cost may be over $50,000 (for example, $50,000 to $100,000 US) per variable frequency converter. A failure rate of the variable speed generator of a known turbine is on the order of 4.5%. Consequently, problems related to known wind, water (river and tidal) turbines relate closely to the failure rate of gearboxes, generators, variable frequency converters or variable power converters and associated electronics and inefficiencies of operation.

A solution to the identified problems is to provide a constant rotational velocity as an input to the constant speed electric generator so that an electricity generator in turn can produce a constant frequency output and deliver a constant voltage and constant current (power) directly to an electric grid. Transmissions or speed converters, for example, have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

A recent development in the art of gearboxes is a magnetic gear which relies on permanent magnets and avoids meshed gears. Magnetic gears, for example, developed by and available from Magnomatics, Sheffield, UK, have an air gap between sheath and shaft and so there is no meshing of gears in a gearbox. Alternating north and south poled permanent magnets may slip with a burst of water energy with a magnetic gear but break a meshed gear gearbox. A magnetic gear yields when a large burst of water energy or a tidal or wave burst of water energy turns a gearbox input while a meshed gear may break or cause considerable wear to a meshed gear of the gearbox.

Known marine hydrokinetic (MHK) turbines such as run-of-the-river, tidal, and hydrokinetic river turbines have problems. There is the problem of having to convert a harnessed variable frequency to a constant frequency and dependable constant power output. On the other hand, there are many advantages for harnessing marine hydrokinetic (MHK) energy: the density (mass or inertia) of water is much greater than that of wind and its speed is not as variable as wind speed especially when used in a relatively constant flowing river or steam which flows continuously in the same direction (such as the Mississippi River of the United States). Tides are reversible (high tide to low tide flowing toward the ocean and low tide to high tide flowing in from the ocean) and associated known turbines may be limited to generating power in one direction of water flow (during changing high to low tide or low to high) and generate maximum power at only two times during a day and so resultant output power is sinusoidal in nature (flowing in to a maximum and then reversing and flowing out to a maximum).

A concept for improving turbines is use of a direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, for example, use power converters or frequency converters and so result in reduced down time for gearbox repairs at the expense of increased cost due to the bigger generators. A speed converter to convert variable speed to constant speed is disclosed in U.S. Pat. No. 8,388,481 of Kyung Soo Han, incorporated by reference as to its entire contents. The speed converter is entirely mechanical and so scalable and improves upon the high failure rate, reliability and efficiency of known electrical/mechanical systems. Speed converters under development are also frequency converters and are shown in this and other patent applications and patents of Kyung Soo Han and are referred to as infinitely variable speed converters or simply speed converters.

Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of U.S. Pat. No. 8,641,570 of Differential Dynamics Corp. (also known as DDMotion), also incorporated by reference as to its entire contents. The DDMotion speed converters are differentiated from those of Torotrak and Fallbrook by their gear drives (no toroids pulleys or belts) and that they are scalable.

A turbine was produced by Hydrovolts, Inc. The apparatus may comprise a waterwheel and may comprise a gear and belt drive inside which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U.S. Published Patent Application 2010/0237626 of Hammer published Sep. 23, 2010, which appears to comprise a waterwheel construction. Hydrovolts' rotating (hinged) blades may control some of the water flow speed, but it is urged that the exposed rotating blades may be susceptible to damage.

A river turbine is known which may be attributed to Free Flow Power Corp. and may have been lowered to the bottom of the Mississippi River or attached to a piling. It is believed that such a device may be very similar to a turbine engine of an airplane but below water level and the water, at velocity, drives a turbine propeller (blades). Due to lowering prices of natural gas, the project became economically unviable (according to their press release in 2012).

New Energy Corp, Inc. of Calgary, AB, Canada in collaboration with the present inventor and DDMotion has recently announced a hydrokinetic turbine that may operate at five kilowatts. These small river turbines are anticipated to be turbines on floating platforms that will come in sizes from live kilowatts to one hundred kilowatts, preferably fifty kilowatts. An installation of a five kilowatt EnviroGen plant is planned for use by the First Nation communities on the Winnipeg River, requires no dams and may comprise a platform anchored in the river, on the river bottom or another appropriate location. The plant is expected to require no fuel, run twenty-four hours a day from river currents, and there may be no need for a large battery bank. The energy harnessing module may comprise propellers or waterwheels that appear to be vertical to face the river water flow of approximately two meters per second at some locations or over three meters per second at other locations on the river.

It is generally known in the art to utilize devices that look much like wind turbines to capture water energy. A tidal and/or river current turbine is known from FIG. 1 of U.S. Pub. Patent App. 2009/0041584 published Feb. 12, 2009. Verdant is now producing a fifth generation propeller turbine that may be mounted on a triangular frame. The diagram provides the labels, showing direction of water flow "A" (from right to left). Note that the turbine rotates on a pole so that rotor blade 150 captures the water as it passes in any direction. Tocardo of the Netherlands produces a rotor blade that rotates to reverse direction for, for example, tidal flow capture. See Tocardo U.S. Published Patent App. 2019/031301A1

A rotating ring device including a rotating ring is known which is available from Oceana Energy Company. FIG. 1 of U.S. Published Patent Application 2012/0211990 of Aug. 23, 2012 of Oceana Energy allegedly comprises hydrofoils both external and internal to the rotating ring.

Perhaps the most like a wind turbine in appearance is the known tidal energy turbine of ScottishPower Renewables, a division of Iberdrola. According to press releases, this tidal device with its propeller (rotor blades) is capable of generating approximately 10 MW of power as an "array" perhaps of twelve or more such devices at less than 1 MW each.

Most maps of the United States show the major rivers which include the Ohio, the Mississippi, the Missouri, the Snake River and the Pecos and Brazos Rivers of Texas. As can be seen from such a map, there is a great potential to harness the water energy of these rivers in the United States and to power, for example, the entire area covered by the Mississippi River and its tributaries including the Missouri, the Platte and the Red Rivers. Using, dams across these rivers to generate electricity would be costly and hinder river traffic and marine lives. It may be that only Free Flow Power has developed a device for use on such a river as the Mississippi, (but Free Flow Power abandoned the Mississippi project in 2012).

Similarly, a map of the world shows the major rivers of the world, further highlighting the potential to harness water energy in rivers world-wide. (Predictable ocean tides cause water to flow upstream in ocean tributaries at low to high tide transitions and downstream in ocean tributaries at low tide and may be more widely used for electric power generation.)

A typical hydroelectric power plant is mounted within a dana of a river. A first step in harnessing water energy in this means is to build the darn to create a pressure head that is proportional to the depth of the water backed up by the dam. The backed-up water is represented by a reservoir or lake. At the base of the darn there may be intake gates which allow water that has been compressed by the head to flow through a penstock to a powerhouse which is one of many such powerhouses that may be constructed along the width of a large dam. One powerhouse may comprise a generator and a turbine which outputs electric power to long distance power lines. Once the water passes through the turbine, it is returned to the river downstream via a spillway.

A variable torque generator (VTG) (called a VPG when varying power output) has been described in U.S. Pat. Nos. 8,388,411; 8,485,933; and 8,702,552 as well as PCT/US2010/042519 published as WO2011/011358 of Kyung Soo Han, incorporated by reference as to their entire contents. The variable torque or variable overlap generator (VOG) has one of an axially moveable rotor and/or stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another. When used in a power generating module to regulate flow of power, the VTG is referred to as a variable power generator or VPG. When used in a torque generator and a power generator to regulate torque and flow of power, the generator is referred to as a variable torque and power generator or VT&PG. Torque and/or power are at a maximum when there is a maximum rotor/stator overlap.

In particular, there is described in, for example, WO2011/011358 or U.S. Pat. No. 8,338,411 (the U.S., '411 patent), the concept of measuring torque/rpm on an output shaft of a system such as a river/tidal/ocean wave/ocean current turbine (which may be referred to herein as a marine hydrokinetic (MHK) turbine) for providing a constant output from a variable flow input. The measured torque/rpm value may be compared with a torque/rpm value stored in, a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase with increasing wind or water flow and vice versa. This variable torque generator (VTG) process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

DDMotion has proposed a variable to constant speed generator including the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. The rotor and stator of the variable power generator are shown such that the rotor may be directly coupled to the shaft. Per FIG. 13 of the '481 patent, "When the stator parts 1330(a) and 1330(b) are moved away from rotor 1310, a minimum input torque results. The operation of a control may be as follows via measuring a torque value stored in memory proximate to the maximum torque that a given rotor shaft 1320 may receive (a maximum allowable torque value), the stator parts 1330(a) and 1330(b) may be moved by a motor (not shown)

to be in removed torque position or a position in between maximum and minimum torque positions whereby a close-to-maximum torque position may be achieved in relation to the measured torque and the maximum allowable torque(/rpm) value or value stored in memory."

Most of today's water/electric conversion is directed to hydroelectric dams, tidal influences and small rivers or canals. According to www.mecometer.com, the potential for development of electricity for large rivers is on the order of over one million megawatts in the USA. Also, the capacity for generating electricity using rivers in China is 1.1 million megawatts and that of the entire world over five million megawatts. So, river and tidal water turbines are not only economically viable, they represent viable renewable energy sources for powering the world without hydrocarbons, high cost and with low maintenance.

A harnessing module may comprise concentric wings, waterwheels, paddle wheels and the like. A concentric wing harnessing module is described in priority U.S. provisional patent application Ser. No. 62/779,683 which is demonstrative of a concentric wing or blade helicopter or plane used for vertical take-off and horizontal flight. This concentric wing harnessing module will have concentric blades which rotate in opposite directions from a centrally geared shaft at equal speed and create greater torque than other forms of harnessing modules such as waterwheels.

Consequently, there remains a need in the art to provide applications of a harnessing module, a control module and a power generating module to provide a constant value of power. Such a generating module as a variable torque and power generator (VT&PG) assembly as well as a controlling module comprising two three variable spur/helical gear assemblies (Transgear gear assembly) called a Hummingbird gear assembly or a Goldfinch™ assembly and a constant speed motor in connection with the generation of electrical energy/power (variable torque and power generator, VT&PG) from renewable sources such as river/ocean current and tidal devices, that is, a marine hydrokinetic river or tidal turbine electric power generator among other possible applications for generating electric power at constant alternating current frequency and voltage for an electric power grid for a small community (for example, in developing countries) or small industrial plant (for example, 25 kw constant power capacity) or for powering the entire Mississippi river basin (several MHK turbines placed periodically along the length of the entire Mississippi river). A river turbine may be designed to comprise a hydrokinetic river turbine that may, for example, comprise a specially designed harnessing module, a control module and a constant power generating module for controlling the output power generated to a constant level, for example, fifty kW and at 50 or 60 Hz.

SUMMARY OF THE PREFERRED EMBODIMENTS

Embodiments of control systems for renewable energy electric power generation at constant frequency may involve the combination of first and second spur/helical gear assemblies called Transgear gear assemblies as a Hummingbird control module, the Hummingbird control having a constant speed control motor, the Hummingbird control for converting variable rotational speed input to constant electrical frequency. A water flow power harnessing module may be a waterwheel, paddle wheel, concentric rotating wing harnessing module or other module designed to harness energy and in particular, balancing torque or $\tau$, at an approximately constant rotational speed or $\omega$ to generate $\omega\tau$ of renewable energy or power. It is a principle of the present invention that $\tau$ (Harnessing Module)=>$\tau$ (Controlling Module)+$\tau$ (Generating Module) since some $\Delta\tau$ (Harnessing Module torque) or $\Delta\omega$ (Harnessing Module speed) shall be released or eliminated if the water speed and generated torque for driving the controlling and generating modules may be released to achieve a constant, for example, fifty kilowatt output to an electric power grid or distributed locally.

A further principle of the present invention is that of achieving constant torque in a balanced three variable system (input, output and control) such that $\tau$=Energy/$\omega$ where $\omega$ is rotational speed of output. Energy is generated electrical power at a baseline level at a constant frequency. By balancing torque $\tau$ and speed $\omega$ in a closed or three variable Hummingbird control system, one may be able to use a constant rotational speed control motor utilizing only about a tenth of the harnessed water flow energy (a relatively small control energy input compared with the energy that is harnessed or generated) to generate a constant, for example, fifty kilowatts of renewable energy. That is, depending on the water flow input and the torque it exerts on a harnessing module, a base-line value of electrical energy may be achieved that is available as electric power output so long as output power exceeds control power.

In one embodiment, to reduce a requirement for generating power to run a constant speed generator at, at least, a constant base-line power, a conventional direct current generator or an AC generator (turned by the harnessing module) or an existing power grid may be used for power to run the constant speed control motor. An embodiment may be powered by storage batteries storing excess generated DC power. Priority U.S. patent application Ser. No. 15/707,138 filed Sep. 18, 2017, now U.S. Pat. No. 10,378,506 issued Aug. 13, 2019, suggests a commutator-less and brush-less direct current generator that is more efficient than known DC generators.

Conventional or recent designs of a direct or alternating current motor for providing a constant rotational velocity to a control module may have an output to regulate a Transgear spur/helical gear assembly or assemblies referred to herein as a Hummingbird variable to constant speed converter control apparatus driven by a specially designed renewable energy harnessing module for a particular river or tidal estuary application so as to not require much power to be drained from an electric grid or from the generated power to operate the constant frequency alternating or direct current generator at constant rotational speed $\omega$ and a baseload level of power.

A principle discovered during development of a Hummingbird control comprising first and second Transgear assemblies (spur gear, miter/bevel gear and ring gear; see FIG.'s) is an analogy between Pascal's Principle applicable to a closed hydraulic system having force=pressure×area where the control force is exceeded by the useable force to what may be referred to as Kyung Soo Han's principle of rotary motion control (analogous to Pascal's principle of hydraulics, also in a closed elect:a/mechanical system or three variable control system, where mechanical power in or electric power out yields the same equation: power=torque× speed where a control motor power is exceeded by the output power as applied to a harnessing module to achieve an electrical advantage at the output.

The controlling module comprising a controlled or constant speed motor useful, for example, in wind and river/tidal/ocean wave/ocean current (MHK) turbines along with the use of spur/helical gear assemblies of sun gears, sets of planetary gears and carrier gears and brackets referred to herein as Transgear gear assemblies or simply Transgear or Hummingbird three variable control modules may be a known direct current constant speed motor or alternating current constant speed control motor or both. Hatch control of a waterwheel, a paddle wheel, a concentric oppositely rotating propeller module (harnessing module) or other known renewable energy harnessing module (water) (or pitch (wind) control for wind turbines) may be needed in tidal estuaries for two directions of water flow.

A river turbine (river flow being relatively constant in one direction) or a tidal turbine (river flow direction changing with the tides) may comprise a harnessing module, a controlling module and a generating module. It is suggested herein to measure waterwheel rotational speeds and developed torque over a period of a month or more at a specific river location (for example, where the current is swift and the depth of the river is greater than, for example, four feet,) with a generator load (for example, fifty kilowatts baseline power output) in order to design a harnessing module, control module, generating module closed system that may balance torque and variable speed sufficient to turn a generator so as to produce a constant value of power at an electrical advantage, for example, fifty kilowatts. As will be described herein, location on a given river having a narrow or wide width or greater depth than a rocky stream may impede the power output and so the system including the harnessing module must be carefully designed. There are described herein a paddle wheel with buckets and a hatch which permits water to drive the waterwheel in two directions (tidal flow) by reversing the hatch or using trap doors and protector bars. Other designs of a waterwheel or propeller or other harnessing modules described above may be used if designed properly following the principles of the present invention including propeller, a pitched blade waterwheel and the like. Such a value of power from a harnessing module at constant frequency may power an entire village proximate to a river or tidal estuary. As introduced above, a harnessing module may have a hatch for rotating 180 degrees for converting tidal flow in two directions, but the waterwheel turns in one rotational direction. An input shaft from a gear box via a harnessing module may turn a Hummingbird speed control system having a constant speed control motor system and a generating module for delivering renewable energy captured by the harnessing module to a generator load or an electric power grid.

The gears of a so-called Hummingbird speed control system may be buffered to a harnessing module by a known magnetic gearbox assembly available from Magnomatics Limited of Sheffield, UK. The magnetic gear assembly permits slippage between gears of a magnetic gearbox so that a gust of wind or sudden increase in water flow velocity will not damage gears of a gearbox or require the use of a clutch. A gear box or a magnetic gear assembly may be replaced by direct connection to the Hummingbird via a torque meter and a tachometer (rotational speed meter) which, in turn may be used to assure a constant output power at the river turbine output.

In river and tidal MHK turbines, a mechanical speed or frequency converter (the Hummingbird) may be used for the purposes of adjusting the harnessed rotational speed of the input which may be slow or fast depending on the rate of river flow or bi-directional tidal flow velocity and desired load value in kilowatts (or larger) with respect to a desired constant output speed (rotational velocity or electric power frequency) for generating renewable electric power to be fed to an electric power grid. A harnessing module may be designed to operate in both directions of tidal current flow for, for example, sixteen hours of a day at 25 kilowatts, four hours a day at 10 kilowatts and store excess generated power in a battery power system for use to provide 25 kilowatts during the eight hours of insufficient delivered power.

An embodiment of a variable speed converter has been constructed and samples are considered having three variables and different "Hummingbird" varieties of simpler and more complex forms constructed and tested. These Hummingbird control varieties of variable to constant frequency and voltage control all provide mechanical synchronization of variable input to constant output and efficient mechanical control of speed, for example, operating at a multiple of 50 Hz (European) or 60 Hz (US) to generate constant voltage and constant power at constant alternating current frequency and the like.

As the three-variable spur/helical gear assembly called a Transgear gear assembly has developed over time from a Goldfinch control system to a first Hummingbird version described in priority U.S. patent application Ser. No. 15/267,655 filed Sep. 16, 2016, after simplification, may comprise two spur/helical gear assemblies combined and share a common shaft coupled to a renewable energy harnessing module with variable speed rotation. The two Hummingbird Transgear assemblies may be reduced in complexity to a single mechanical assembly with few moving parts as samples have been constructed and simplified. It is important to note that since a speed converter converts variable speed to constant speed and converts constant speed to constant frequency, DDMotion's speed converters may be called a mechanical frequency converter or a "rotary frequency converter" as is called in the industry to differentiate from an electronically controlled variable power converter or variable frequency converter (WC) or variable frequency drive (VFD) which are less efficient and may break down easily.

In particular, in MHK river and tidal turbines, it is suggested that a known generator or a variable overlap generator comprise an adjustment of the relative phase angular (radial) relationship between the rotor and stator in addition to the concept of adjusting the (axial) position lengthwise of a moveable rotor or stator in a variable torque and power generator (VT&PG) for variable torque and power or variable overlap generator (VOG) with variable input velocity (typically rotational speed) and desired output electric frequency and voltage. This concept is especially useful for mechanical speed converters for synching the phase angle of variable input with, for example, a desired constant output velocity (convertible to electric power frequency, for example, at 60 Hz US and 50 Hz European) and constant voltage (but variable current depending on the wind/water velocity).

A further practical application of VT&PG is to provide a reciprocating input to a fixed torque and power generator (FT&PG) sometimes referred to as a fixed overlap generator (FOG) for generating electricity with a reciprocating rotor. This concept eliminates a process of converting erratic motion of ocean wave energy, for example, to a rotary motion before generating electricity and may eliminate the need for Sprigs from the speed converter(s) described in prior patent applications and patents of the present inventor, and reduces cost, weight, size, and potential validation time. For the purpose of increasing, the harnessed speed of reciprocating input or preventing the mechanical gearbox damage due to the sudden surge of power of reciprocating input, using magnetic gears or electromagnetic coupling instead of toothed gears may improve the durability of a gearbox connected to the harnessing module without damaging the gears. The magnetic gears of a magnetic gearbox (having no teeth) may intentionally slip (rather than break) in the event of a strong gust of wind or a strong water flow until a predetermined level of torque between magnetic gears is reached at which point the magnetic gears magnetically mesh with one another and do not slip (unless there is another strong gust of wind or strong surge of water flow).

A further practical application of VT&PG is to use a VT&PG as a reactive speed controller by adjusting the torque or varying the load so that the waterwheel speed may, be increased or decreased in a river/tidal/ocean wave/ocean current, marine hydrokinetic (MHK) turbine. In this embodiment, the VT&PG may increase or decrease torque by axially moving the rotor and stator relative to each other in MHK or wind turbines (or any variable load) for control of a waterwheel (or propeller/blades) or Hatch of such a MHK turbine. In an MHK turbine, the reactive torque control may be applied to control waterwheel speed until reactive control reaches a designed maximum and then Hatch control may be used for further waterwheel speed control with respect to desired output electrical power frequency and amount of current generated. A VT&PG may accept rotating or reciprocating tidal turbine input because the input change may vary positively or negatively from a reference value from an erratic energy source, for example, and may provide reactive control because the waterwheel reacts quickly to a load (or to a brake).

A variable torque and power generator (VT&PG) useful in all embodiments for controlling torque/rpm/power from a maximum to a minimum is shown in perspective view in FIGS. 3A, 3B and in a practical application in FIG. 5 of the priority '655 patent application, the figures showing rotor and stator coupled magnetically or electromagnetically for minimum and maximum overlap. (There may be an infinite number of positions between minimum overlap and maximum overlap in a VT&PG but minimum and maximum overlap positions are shown by way of example). The utilization of a variable torque and power generator (VT&PG) as shown in FIGS. 3A and 3B has been validated by the University of Maryland, Baltimore County, as a useful control device for controlling the torque, rotational speed, and power. When the available input torque at the cut-in speed is below the specified value to generate electricity, the VT&PG torque may be reduced, and when the provided input power is more than the specified rated power, the rated power of the VT&PG may be increased. In this case the power rating of the VT&PG has to be higher than the FT&PG (Fixed T&P Generator). Another way of using the embodiment is by adjusting the torque, the rotational speed of the harnessing device, a waterwheel or an assembly of wind rotor blades having parameters (such as propeller pitch or using a hatch) that may be controlled. For steady flowing streams and rivers, without much flow rate variation, a constant speed output can be easily produced by compensating the input. In strong tide and river current turbine applications, considerably more control is required due to the more extreme variation, for example, in water velocity from practically a calm river to a high velocity storm driven stream so as, to not break the meshed gear gearbox at the input. This may be rectified by using a magnetic gear comprising magnetic poles which will not breakdown. As shown in FIGS. 2A, 2B and practical application FIG. 6 of the priority '655 patent application, a magnetic gear of a magnetic gearbox 620 (replacing mechanical gears with teeth) may provide an input to a Hummingbird speed control converter to provide a high efficiency, high power, low maintenance electric power generating system which is also scalable to different capacity needs. Use of a constant speed motor may be used with the Hummingbird models to achieve the improvements to constant speed/frequency and voltage control.

In MHK turbines, for example, the VT&PG may be used to advantage regulating output shaft rotational velocity to a constant value. The concept of releasing power is now explained. There is a specially designed harnessing module for capturing as much river or tidal water flow as possible (torquer $\tau$ and rotational speed $\omega$) to generate electrical power in excess of the power value of the control motor. The generated electrical value is maintained at a constant baseline power ($\tau\omega$) as input water flow increases.at particularly chosen locations on a river or tidal estuary. There is a controlling module, the Hummingbird, used to convert variable captured water energy to a constant value of energy for driving a load generator of power that is then provided to a grid or stored in batteries. The generator load helps the control input (from a control motor—AC or DC) to unwind or release the input energy. By "release" is intended the definition of rotationally turning a control in one direction or another direction. In one embodiment described herein, a set of worm and pinion gears is a one-way control of a control motor for the Hummingbird controlling module. Unwinding input rotation of a harnessing module by a control motor with a set of worm and pinion gears requires less torque than input torque. The input torque (the harnessing module) does not change when unwound and the renewable energy harnessed may be ten times the power value used by a control motor. The layout of harnessing module, control module and generator load may be completed, for example, as a fifty kilowatt river or tidal turbine. Required controls are a variable load control to assure a constant electrical energy output and grid connector control for connection to a microgrid.

FIGS. 1(A) through FIG. 10C of the present application are provided by way of example to show river and tidal turbines operating under principles of one of balancing torque and rotational speed, matching a minimum control power to a maximum output power, and then controlling the multiple of output power over constant power by means of, for example, an adjustment algorithm, the application of magnetic gears of a magnetic gearbox, a conventional twenty-five kilowatt electricity generator or a known VT&PG (VOG) in an MHK turbine, output speed or electric current frequency control from variable to be relatively constant via a constant speed control motor and the various prototypes of Hummingbird three variable gear assembly embodiments (mechanical frequency converter) used to convert variable water (and wind flow rates) to balance torque and rotational speed and match variable harnessing module revolutions per minute and harnessed torque $\tau$ to constant frequency, current and voltage rates for provision to a twenty-five or even a fifty kilowatt baseline load of an electric grid at varying water flow rates (tidal flow included). A constant speed motor of a Hummingbird speed control apparatus may be powered by the grid or by the input generated power or use in a distributed environment, for example, the commutator-less, brush-less DC generator as described above to output harnessed renewable energy to run the control alternating or direct current constant speed motor. The same principles may be applied to solar, wind and MHK turbines to obtain constant output rotational velocity or electric current frequency and voltage and to adjust propeller pitch in comparison to variable wind/water or solar renewable energy sources.

These and other embodiments will be described with respect to the drawings, a brief description of which follows.

BRIEF DESCRIPTION OF THE DRAWINGS

FIG. 1A through FIG. 1B respectively comprise a perspective view and a layout or cut view diagram of a building block of a speed converter, also known as a basic spur gear Transgear assembly having three variables per perspective view FIG. 1A: variable #1 101 is a left sun gear; variable #2 comprises first and second carrier gears and pins: 102-1 and 102-2, respectively; and variable #3 is right sun gear 103. Per FIG. 1B, a carrier gear assembly comprising carrier gears and pins 102-1, 102-2 is shown with diagonal lines from lower left to upper right, and planetary gears 104-1 and 104-2 are shown with diagonal lines from lower right to upper left.

FIG. 2 shows how a basic spur gear Transgear gear assembly of FIGS. 1A and 1B works when there may be two known speed values and known directions of two variables 210 and 220 and a speed of a third variable carrier gears C having rotational speed and direction 230 must be calculated according to Transgear Rule 240 as shown.

FIG. 3 shows a general configuration of a Hummingbird Speed Converter having two Transgear spur gear assemblies (different embodiments than those of FIGS. 1A, 1B and 2), and an adjustment function 340 located between the first Transgear assembly with variable input #1 310 and the second Transgear assembly with Output #2 370.

FIG. 4 shows details including the Adjustment Algorithm (or function) 440 in three steps 430, 440 and 470: (1) identify Δ, the variable input speed, for example, caused by variable input water flow speed related to renewable energy harnessed by a harnessing module (not shown). Then, the second step 440 of the Adjustment Algorithm (or function) 440 is step (2) to adjust output #1 or Δ to −Δ rpm. The adjusted Output #1 becomes Control #2 450 input to the right Transgear spur gear carriers and to adjust Output #1 430 to be its negative or Control #2 450=−Δ rpm. The third step (3) 470 is to eliminate the variable Δ from Input #1 410 leaving constant X rpm, a minimum baseline rotational speed.

FIG. 5A, FIG. 5B and FIG. 5C show a test structure of a Hummingbird #4B with a load 530 and meters for measuring voltage 535, frequency 545, speed 540 and power 550 with respect to a configuration of the Hummingbird #4B per FIG. 5B showing first and second spur gear assemblies of the Hummingbird #4B and corresponding diagram of the Hummingbird #4B per FIG. 5C.

FIG. 5B shows a configuration of two spur gear assemblies side by side while the diagram of Hummingbird #4B showing first and second Transgear gear assemblies of FIG. 5C comprises left and right spur gear assemblies whose shafts are integral or connected together and are integral or connected to the right sun gear 581 of the left spur gear assembly and to the left sun gear 582 of the right spur gear assembly.

FIGS. 5D and 5E show two tests, Test-1 and Test-2, respectively, where a Test-1 test procedure 502 (see horizontal line in bold where Load 504 is 0 Watts) shows a 0 Watt load 504, control motor 525 speed at 1,200 rpm but the control motor speed 525 and frequency 514 decrease with increasing load 504 (see two vertical boxes in bold for control motor speed 525 and generator frequency 514 are decreasing), and there is no adjustment to control motor speed 525 or to frequency 514 with increasing frequency 506. On the other hand, in FIG. 5E, test procedure 522 shows adjustment of frequency 526 to 60 Hz with increasing load 524 so that frequency 534 remains constant at 60 Hz. The same horizontal line and two vertical boxes in bold are shown in FIG. 5E as in FIG. 5D).

FIG. 5D further shows test procedure 502 for Test-1 of FIG. 5D in further detail and comprises a. setting the load 504 at 0 watts; b. Input Motor rpm=a variable from 800 rpm to 1600 rpm; c. Control Motor rpm, initially at 0 watts load=a constant 1200 rpm but control motor speed 525 reduces from 1,200 rpm at no load to 1,184 rpm with no adjustment to frequency 506 with increasing load; at d. read the generator output frequency 514 at meter 545 which is initially at 60.0 Hz and reduces to 59.2 Hz with no adjustment to frequency with increasing load, and at e. increase the load 504 and read the frequency 514 and repeat, for example, when the frequency 514 reduces by a predetermined amount selected within a range, for example, 0.1 to 0.4 Hz, preferably 0.3 Hz.

FIG. 5E further shows test procedure 522 for Test-2 of FIG. 5E in further detail. FIG. 5E corrects the reductions in control motor speed 525 and frequency 534 with increasing load 524 from 0 load to 180 watts load by adjusting control motor speed to remain at 1200 rpm so that, by adjusting frequency 526 to a constant 60 Hz with increasing load 524, control motor speed remains at 1200 rpm and generator output frequency 534 also remains at a constant 60 Hz frequency.

FIGS. 6B, 6C, 6D, 6E, 6F1, 6F2 are related to FIG. 6A.

FIG. 6B is a diagram and shows a designed speed of operation of a Hummingbird #4D shown in FIG. 6A where the Variable Input 660 is a constant 1800 rpm plus a variable Δ rpm, the output 675 measured at output shaft, (output to generator 675), is 3600 rpm, twice the input with the variable Δ eliminated.

FIG. 6C shows a test procedure 602 for Hummingbird #4D (FIG. 6B) for increasing load 606 (606A and 606B) and highlights an observation 624 with PID (proportional integral derivative) control (see unnumbered box under Power kW 614) that as soon as output power 614C exceeds a control power 614B, there is an electrical advantage. Notice the box surrounding certain values in bold of control power 614B versus output power 614C where output power 614C first exceeds control power; (see FIG. 6E).

FIG. 6D is a diagram showing a first spur gear assembly 680 (Transgear #1) and a second spur gear Transgear assembly 685 (Transgear #2, where it is relatively easy to access measurements of variable input rotational speed 660 and output speed 675, torque, control power 665 and the like. FIG. 6E shows a graph of Test #16H (FIG. 16C) comprising increasing input power 660, and the graph (FIG. 6E) shows, as load (Output) power in Watts increases, there is a crossing point where output power exceeds control power so that there is an electrical advantage which may be a baseline power level for output to an electric grid or for distribution.

FIGS. 6F1 and 6F2 show Pascal's closed hydraulic system principle compared with a proposed principle to be called Han's principle for obtaining an electrical advantage in a balanced, three variable rotary speed converter system comprising, for example, first and second spur gear assemblies. The proposed principle of achieving an electrical advantage when output power exceeds control power (line crossing of graph, FIG. 6E) is derived from the test data #16H 604 of FIG. 6C.

FIG. 7A shows a configuration of a Hummingbird for three step speed conversion of a Variable Input 710 of 1800+Δ rpm to a first spur gear assembly to an Output 760 of −1800 rpm of a second spur gear assembly.

FIG. 7B1 is a diagram of a Hummingbird speed converter for three step conversion with small letters representing gear components: a through h of a Gears table of FIG. 7B2. A Variable Input 710 of FIG. 7B1 of 1800+Δ rpm is provided to a connected shaft including sun gears #1 a and sun gear #2 g, the shaft connecting the first and second spur gear assemblies.

FIG. 7C provides a further understanding of the three step conversion process following the Transgear rule using the same small letters a (Variable Input) through h (Output) in a Description 715 and calculations 725. The variable −Δ is identified at c; −Δ is adjusted to Δ/2 at f; and the variable Δ is eliminated at h where Output h is −1800 rpm while the value of Variable Input speed 725 varies from 1800 to 2700 to 3600 rpm and variable Δ of Variable Input a of X+Δ rpm varies from 0 to 900 to 1800 rpm in bold under Variable Input 725 line a.

FIG. 8 is a case study #1 with a diagram of spur gear Transgear Hummingbird #4D5 showing a control motor 840 having a speed of 3540 rpm constant. The Variable Input 810 is 110.625+Δ rpm where 110.625 rpm is a constant and Δ is a variable and the output 850 is 885 rpm.

FIGS. 9A-9C show that, further to the first case study (FIG. 9A) for Transgear #1 920-1 and Transgear #2 930-1, spur gear assemblies, other Transgear assemblies such as a bevel/miter gear Transgear #1 920-2 and Transgear #2 930-2 (FIG. 9B) and a ring gear Transgear #1 920-3 and Transgear #2 930-3 (FIG. 9C) may be structured as Hummingbird speed converters and provide an electrical advantage.

FIGS. 10A through 10C show various modifications that may be made to a basic spur gear transgear, for example, by changing gear diameter ratios where in FIG. 10B a left sun gear is enlarged compared to a diameter of a right sun gear and FIG. 10C where a right sun gear is enlarged compared to a diameter of a left sun gear.

Figure 6A:
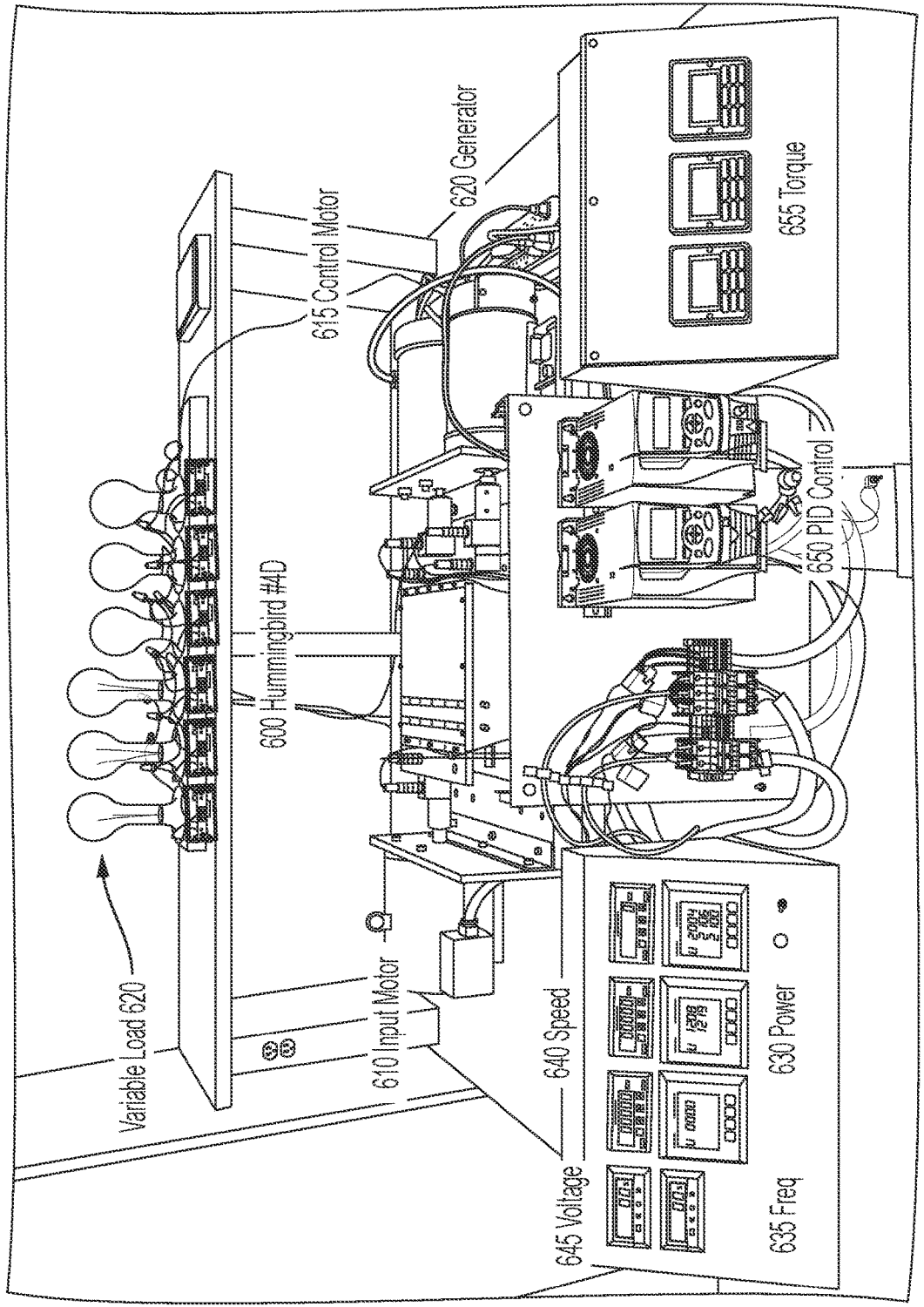
FIG. 6A comprises a test structure of an input motor 610, a control motor 615, a generator 620, a Hummingbird #4D speed converter 600 with a variable load 620 of light bulbs and meters for measuring voltage 645, speed 640, torque 655, frequency 635 and power 630 with PID (proportional integral derivative) control 650.

These and other features of the present invention will be described in the detailed description of the invention, and depicted in the accompanying drawings.

DETAILED DESCRIPTION

In the figures of the present embodiments of the invention comprising FIGS. 1A through 10C, an effort has been made to follow a convention such that the first reference number for a drawing component such as 1XX indicates a figure number as the first digit where the element first appears; for example, Variable #1 left sun gear 101 first appears in FIG. 1A and also appears in FIG. 1B.

FIG. 1A through FIG. 10C provide three variable Hummingbird speed converter mechanical assembly diagrams for a basic spur/helical gear assembly, also known as a Transgear gear assembly, where two such assemblies are utilized to build a Hummingbird speed converter. It is discovered in laboratory and site testing that an electrical advantage is achieved when a control load line is crossed by an output, generated electricity line to provide a baseload value of electricity and an electrical advantage. Bevel/Miter gears may also be used as may ring gears.

FIG. 1A through FIG. 1B respectively comprise a perspective view of a building block of a speed converter, also known as a basic Transgear spur gear assembly having three variables per FIG. 1A: variable #1, left sun gear 101; variable #2, carrier gears and pins 102-1 and 102-2; and variable #3 right sun gear/sleeve 103. A basic Transgear gear assembly may be an assembly of spur gears (shown), bevel gears, ring gears or other types of gears having three variables which provide infinitely variable control. (See FIG. 9B for bevel/miter gear Transgears and FIG. 9C for ring gear Transgears). The assembly of gears is scalable in that the different types of gears may have different diameters, and, for example, the quantity of planetary gears may be two or more. Referring first to FIG. 1A, the perspective view shows a first variable 101 comprising a left sun gear 101, integral or connected to an input shaft (unnumbered). A second variable 102 is a pair of carrier gears 102-1, 102-2 which rotate freely and have pins that support, for example, first and second planetary gears 104-1, 104-2 which are meshed together per FIG. 1B and have diagonal lines from lower right to upper left. The second planetary gear 104-2 is also meshed with a third variable, namely, the right sun gear/sleeve 103 of FIG. 1B. Per FIG. 1B, the carrier gears 102 have pins shown having diagonal lines from lower left to upper right forming an assembly with the carrier gears. The left planetary gear #1 104-1 is also meshed with the left sun gear 101 while the second planetary gear #2 104-2 is also meshed with the right sun gear 103.

FIG. 2 shows how a basic spur gear Transgear assembly works when there may be two known speed values and known direction values of two variables 210 and 220 and a third speed and direction value for carrier gears and pins C must be calculated. Assume that L, left sun gear 210, rotates at 1 rpm clockwise (CW). Also, assume that R, right sun gear 220, turns at 1 rpm counterclockwise (CCW) (value of −1 rpm), then, what is the value of the carrier gear and pin assembly C 230 speed and direction of rotation? A Transgear rule 240 is that C=(L+R)/2. In this case shown, C=(1+(−1))/2=0 rpm. The carrier gears do not rotate (C='s 0 rpm) and so have no direction of rotation. The right sun gear 220 rotate at equal rpm and in opposite directions. This is a simplified example of calculating carrier gear rotational speed.

FIG. 3 shows a general configuration of a Hummingbird Speed Converter having an adjustment algorithm (or function) 340. At the left of FIG. 3 is seen a first spur/helical gear assembly having variable input #1 310 to an input shaft #1 315, control #1 320 applied to a right sun gear/sleeve/extension disc 326, output #1 330 from a carrier gear and pin assembly 318 having diagonal lines from lower left to upper right receiving Variable Input #1 310 at an input shaft #1 315 and integral or connected left sun gear (unnumbered). The rotation of right sun gear/sleeve/extension disc 326 is Control #1 320 provided to the sun gear/sleeve/extension disc 326. These produce an Output #1 330 at carrier gears 318, also impacted by Control #1 320, which leads to an Adjustment 340 which may comprise an algorithm (or function) as described in FIG. 3. The Adjustment 340 outputs a Control #2 350 which is fed to the carrier gear assembly 362 (diagonal lines from lower left to upper right) of a second, right spur/helical gear assembly with a left planetary gear 363-1 meshed with right planetary gear 363-2 (diagonal lines from upper left to lower right) by a first of two pins of the carrier gear assembly 362 meshed with a left sun gear of the input shaft #2 365 (diagonal lines from lower left to upper right) which receives Variable Input #2 360. Output #2 370 is an adjusted output at the right sun gear/sleeve/extension disc 366 (diagonal lines from lower left to upper right). In this way an input rotational speed, Variable Input

1 310, is converted to a different output speed, Output #2 370 which may be a constant speed and any variable speed (Δ) at the Variable Input #1 310 (X+Δ rpm) eliminated.

FIG. 4 shows details of a three step speed conversion algorithm of Adjustment 440 in an instance where Control #1 420 may be a constant value −X in rpm of the right sun gear/sleeve/extension disc 326 of the left Transgear assembly of FIG. 3. Let us assume that Variable Input #1 (X+Δ rpm) 410 is a water flow rate turning a harnessing module (not shown) having a torque causing an input shaft #1 315 and integral left sun gear to rotate at Input Variable #1 410 at (X+Δ rpm) where X is a constant and Δ is a variable depending on the rotational speed of the harnessing module (not shown) as modified by any intermediary gears. Then, Output #1 430, step (1) is to Identify Δ where Output #1=Input #1+Control #1 or (X+Δ)+(−X)=Δ rpm. Thus, the first step (1) of the Adjustment Algorithm at 430 is to identify the variable Δ: Output #1=Input #1+Control #1= (X+Δ)+(−X)=Δ rpm. Then, at 440, the second step of the Adjustment Algorithm is step (2) to determine Control #2 450 by adjusting Δ to −Δ which='s −Δ rpm. The Adjustment at step 440 to Output #1 to become Control #2 input to the right Transgear carrier gear assembly 362 is to adjust Output #1 to be its negative or −Δ rpm. If the input shaft #1 315 is tied to Input Shaft #2 365, the output shaft, Input #2 460=Input #1 or (X+Δ rpm). Thus, the third step (3) at 470 is to eliminate the variable Δ. Then, Output #2 470=Input #2−Control #2=(X+Δ)+(−Δ)=X rpm (the original rotational speed value of Control #1 420 but in the opposite rotational direction).

FIG. 5A, FIG. 5B and 5C show a presentation of test results of a Hummingbird speed converter #4B. FIG. 5A, FIG. 5B and 5C show a test structure of a Hummingbird #4B with a load 530 (60 Watt light bulbs shown) and meters for measuring voltage 535, frequency 545, speed 540 and power 550 with respect to a configuration FIG. 5B and diagram FIG. 5C. Referring to FIG. 5A, an input motor 505 provides an input rotational speed in rpm to Hummingbird speed converter assembly 510. A transformer 515 is shown for adjustment (as will be described per FIG. 5E, the adjustment of control motor 525 speed to a constant 1200 rpm and frequency 534 to a constant 60 Hz as load 524 in Watts increases) and a control motor 525 provides a control power and speed while generator 520 provides an electrical output of Hummingbird #4B 510. A Control speed value of Control=1200 rpm 565 per FIGS. 5B and 585 per FIG. 5C is supplied at left sun gear/sleeve/extension discs 566, 562 in FIG. 5B and 586 in FIG. 5C respectively. The left carrier gear and pin assembly 573 of FIG. 5B provides Control Output 570 to Control Input 571 to the carrier gear and pin assembly 572 of the right spur gear assembly of FIG. 5B. Since the Output 575 equals the Control 565, no adjustment is needed and the Output=Control=1200 rpm at Control 565, Control Output 570, Control Input 571 and Output 575. Given Variable Input 560=800+Δ rpm, then Δ=400 rpm. Configuration FIG. 5B shows a Variable Input=800+Δ rpm at right sun gear/sleeve/extension disc 561 of the left spur gear assembly. A constant rpm of X 800 rpm speed is enhanced by a variable Δ rpm such that 800 (a constant X)+Δ (possibly a variable speed) are provided as variable inputs 560, 580 (FIGS. 5B) to the left and right spur gear assemblies' right and left sun gear/sleeve/extension discs 561, 566; 591, 586 respectively. But due to the configuration (FIG. 5B) and the fact that no adjustment is provided, Δ is a constant 400 rpm. FIG. 5B additionally shows planetary gears 562-1 and 562-2 meshed together as in FIG. 3. Right and left shaft portions 564, 574 are also shown in configuration FIG. 5B.

The diagram of Hummingbird #4B of FIG. 5C comprises left and right spur gear assemblies 576, 577 whose input shafts are integral as input shaft 578 or connected to or integral with the right sun gear 581 of the left spur gear assembly 576 and the left sun gear 582 of the right spur gear assembly 577. Variable Input 580 is shown as 800+Δ rpm as was Variable Input 560 of FIG. 5B and is input to input shaft 578. Control rotational speed 585 of 1200 rpm is shown provided as in FIG. 5B at left extension disc/sleeve/left sun gear 586. The carrier and pin assemblies 587, 588 of the left and right spur gear assemblies are attached together. The Output 590 is the same as the Output 575 at the right extension disc/sleeve/run sun gear 591 of the right spur gear assembly=1200 rpm. Therefore, the Variable Input 580 of 800 rpm+Δ rpm at input shaft 578 having integral sun gears 581, 582 works out that Δ is a constant or 400 rpm, Output=Control and Δ is a constant 400 rpm. Again, no adjustment is needed when the carriers of the first and second spur gear assemblies are attached together as they are in FIG. 5C. FIG. 5C additionally shows planetary gears 583-1, 583-2 and 593-1, 593-2 meshed together as in FIG. 3 and FIG. 5B and supported by the pins of carrier and pin assemblies 587 and 588.

Two tests, Test-1 and Test-2, are shown in FIG. 5D and FIG. 5E respectively of Hummingbird speed converter #4B. FIGS. 5A, 5B and 5C show a sample Hummingbird #4B structure of a Hummingbird speed converter, where FIG. 5A shows a light bulb load 530 and meters for frequency 545, voltage 535, speed 540 in rpm, power and speed meters 550, 540 (540 and 550, three meters each). Specifically, it may be seen that two of three speed meters 540 register 1200 rpm (X+Δ rpm) and the third speed meter registers the constant speed X portion of variable input #1 410 at 800 rpm. Power meters 550 are multi-button meters and may be turned off (the meter 550 on the left) or register a power component (the two meters on the right with screens lit).

Test procedure 502 for Test-1 of Hummingbird #4B (FIGS. 5A, 5B and 5C) of FIG. 5D comprises setting the load at a. to 0 watts; b. Input Motor speed in rpm simulating a harnessing module=a variable input rotational speed from 800 rpm to 1600 rpm; c. Control Motor 525 speed in rpm=a constant 1200 rpm at Load 504=0 Watts; at d. read the frequency at meter 545, and at e. we increase the load and read the frequency and repeat periodically, for example, when the frequency 514 reduces by a predetermined amount selected within a range, for example, 0.1 to 0.4 Hz, preferably 0.3 Hz as load 504 increases. There is no adjustment to control motor speed 525 or generator speed 520 as well as frequency 514 as load 504 increases. Results are shown in the table comprising load 504, frequency 506, input motor 505 of 1 hp rotational speed in rpm, control motor 525 of 0.13 hp rotational speed 525 in rpm, generator 520 max load of 0.5 hp having reducing speed in rpm with increasing load along with control motor speed 525 and frequency 514 reducing with increasing load 504 from 60 Hz. Two observations #1 and #2 are shown as 516, 518 respectively. The first observation #1 516 is that while the load varies (from 0 watts to 180 watts, when the load 504 is 0 Watts, if the control motor 525 and generator 520 is at 1200 rpm, the frequency is 60 Hz. But per Observation #2, as or when the load increases above 0, first to 60 watts, then, 120 and 180 watts, the control motor, generator speeds and frequency output 514 of the generator 520 decreases. No further adjustment in frequency is provided at 506, but frequency 514 decreases as the load 504 increases from 59.7 to 59.5 to 59.2 Hz. Also, the control motor 525 and the generator 520 show a reduction in speed in rpm as the load increases. This is shown in FIG. 5D by boxes around Control Motor 525 speed and Frequency 514 output of generator 520 respectively with the horizontal line across the table at no load below the line shows where Control Motor, Generator and Frequency all reduce with increasing load 504. Adjustment will prove to be useful in Test-2 of FIG. 5E as Load 504 increases.

Test procedure 522 for Test-2 of FIG. 5E showing data comprising increasing load 524, adjusting load and frequency 526 back to 60 Hz in the presence of increasing load 524, then, control motor speed 525 may also be constant at 1200 rpm, 0.5 hp generator maximum load also at 1200 rpm and frequency 534 at 60 Hz shows that control motor speed 525 of FIG. 5D may be corrected at step c. of FIG. 5E of adjusting control motor speed back to a constant 1200 rpm corrects a reducing speed and frequency problem of FIG. 5D. FIG. 5E solves a problem of FIG. 5D where control motor 525 speed and frequency 514 (in boxes) drift downward with increasing load. There are no reductions in control motor speed 525 and frequency 534 with increasing load 524 due to adjustment in Test-2 of FIG. 5E via transformer 515. Test procedure 522 for Test-2 of Hummingbird #4B comprises setting the load at a. 0 watts; b. Input Motor rpm=a variable from 800 rpm to 1600 rpm as in Test-1; c. Control Motor rpm is intentionally adjusted to a constant 1200 rpm via transformer 515; at d. we read the frequency at meter 545, and at e. we increase the load, adjust the control motor 525 speed to 1200 rpm. We read the frequency and repeat for example, to increase the control motor speed back to 1200 rpm when the control motor speed reduces by a predetermined amount such as a value between 3 and 10 rpm via transformer 515. Results are shown in the table comprising load 524, frequency 526, input motor of 1 hp speed in rpm, control motor of 0.13 hp speed 525 in rpm, generator 520 max load of 0.5 hp having constant speed in rpm with load along with control motor speed and frequency 526 remaining constant with increasing load 24 at 1200 and 60 Hz respectively. Observations #3 536 is shown that if the control motor speed 525 is adjusted to 1200 rpm with increasing load 524, the frequency 534 also remains constant at 60 Hz.

FIGS. 6B, 6C, 6D, 6E, 6F1, 6F2 are related to Test structure FIG. 6A which comprises a test structure of a Hummingbird #4D speed converter 600 (see FIG. 6B, Hummingbird #4D diagram) with an input motor 610 providing a simulated rotational speed, a variable load 620, 606, 606A, 606B and meters for measuring voltage 645, speed 640, 608, input 608A, control 608B, output 608C, torque for measuring torque 612, input 612A, control 612B, output 612C measured by torque meters 655, frequency meter 635 for measuring frequency 616 and power meters 630 for calculating power ratio 622 as Control Power/Output Power. FIG. 6B is a diagram and shows a designed speed of operation of the Hummingbird #4D speed converter shown in FIG. 6A. If variable input 660 (X+Δ) is a constant 1800 plus a variable Δ rpm, the input is fed to both Transgear assembly #1 680 and Transgear assembly #2 685 via unnumbered Transgear #1 and Transgear #2 input shafts. An adjustment 670 is applied of 1 to −½ times the speed in rpm. Consequently, at the right sun gear of the left Transgear #1 680, there is an adjustment 670 felt at the left carrier gears of the right Transgear from 1 rpm at the unnumbered right sun gear to −½ rpm at the unnumbered carrier gear assembly (diagonal lines from lower right to upper left). At the output to generator 675 (generator not shown) measured at unnumbered output shaft and collected by unnumbered output shaft gear, the speed is 3600 rpm, twice the input X of 1800 rpm with the variable Δ rpm eliminated. Control Input 665 at 1800 rpm is fed to unnumbered control shaft with an unnumbered control shaft gear meshed with unnumbered split gears #1 and #2 to an unnumbered carrier gear assembly of Transgear #1 680 having pins for holding unnumbered planetary gears #1 and #2 meshed with one another.

FIG. 6C shows a test procedure 602 for Hummingbird #4D for increasing load 606, 606A and cumulative 606B and highlights an observation 624 with PID (proportional integral derivative) control (see unnumbered box under Power 614: Control 614B and Output 614C and FIG. 6E) that as soon as output power exceeds a control power, there is an electrical advantage. Data 604 is shown as a table comprising Load 606, Watts 606A and cumulative Watts 606B where 606B is the sum of loads 606A. Data 604 also comprises speed in rpm where 608A is the input speed, 608B is the control speed and 608C is the output speed. Torque in Nm 612 comprises input torque 612A, control torque 612B and output torque 612C. Power in kW 614 comprises input power 614A, control power 614B and output power 614C. Also, in test data #16H 604 are frequency 616, voltage 618 and power ratio (PR) 622 Control Power/Output Power for varying loads. A highlighted in bold horizontal line of data 604 shows data for no load. Notice the box surrounding certain values of control power 614B versus output power 614C when the PR 622 decreases from 1.05 to 0.90. At load 606B of 885 Watts, the output power 614C of 809 watts exceeds the control power 614B of 733 watts. The power ratio PR 622 becomes less than 1.0 and there is an electrical advantage per the line crossing in FIG. 6E. Then, at a load of 1065 at 606B (outside the box), the output power exceeds the control power by 955 watts to 824 watts, an electrical advantage.

FIG. 6D is a diagram of a Hummingbird speed converter #4D where, in a first spur gear Transgear assembly 680 and a second spur gear Transgear assembly 685, it is relatively easy to access measurements of speed, torque, power and the like. The control power is taken at 665 and the output power at 675 when the variable input power (X+Δ) is measured at 660. FIG. 6E shows a graph of Test #16H increasing input power as an upward curve and shows as load power (horizontal axis) in Watts increases, there is a line crossing point where output power (Power vertical axis in kW; horizontal axis load in Watts) exceeds control power so that there is an electrical advantage which may be a baseline power level X for output to an electric grid or for distribution.

FIGS. 6F1 and 6F2 shows similarities between Pascal's closed hydraulic system principle compared with a proposed principle to be called Han's principle for obtaining an electrical advantage in a balanced, three variable rotary speed converter system comprising, for example, first and second spur gear assemblies. Note the similar steps 1. through 9. of Pascal's principle compared with Han's principle. The proposed Han's principle (graph FIG. 6E) is derived from the test data of FIG. 6C. When output power exceeds control power, there is an electrical advantage.

FIG. 7A shows a configuration of a Hummingbird for three step speed generation and FIGS. 7B1 and 7B2 show a diagram of the three step conversion and FIG. 7C shows a table for an understanding of the three step conversion respectively. The configuration of FIG. 7A comprises first and second spur gear assemblies (both unnumbered) where a rotational speed Variable Input 710 of 1800+Δ rpm at a left sun gear of an input shaft of the first and second spur gear assemblies is provided with a control speed of 900 rpm at control input 720 to produce an output of the first spur gear assembly at 730 of −900 rpm for adjustment at 740 to 450 rpm becoming the control variable 750 of 450 rpm to the carrier gear assembly (light diagonal lines from lower left to upper right) of the second spur gear assembly output to generator (not shown) 760 as the negative of the input −1800 rpm having eliminated any variation Δ in the variable input speed 710 (1800+Δ rpm). Thus a constant output speed 760 from a variable input rotational speed is delivered to a generator (not shown); (opposite rotational direction from the Input with no variable Δ and an electrical advantage are provided from a variable input rotational speed so long as the control power is less than the output power).

FIG. 7B1 is a diagram of a Hummingbird speed converter with letters a through h representing component gears. A variable input 710 of 1800+Δ rpm is provided to an input shaft having integral or connected Sun gear #1 a and Sun gear #2 g as seen in Gears table FIG. 7B2 connecting unnumbered first and second spur gear assemblies (tightly spaced diagonal lines from lower left to upper right). The left sun gear of the left Transgear is labeled a and the left sun gear of the right Transgear is labeled g. These letters appear in a Gear Table FIG. 7B2 as follows: Carrier #1 b (light diagonal lines from lower left to upper right) is Control #1; right sun gear/sleeve/extension disc #1 c is Output #1; gears labeled d and e are idle gears of adjustment 740 leading to carrier f (light diagonal lines from lower left to upper right) which is Control #2 where, for example, c=e=−f/2 where idle gear e surrounds the adjustment 740. Output #2 is right sun gear/sleeve/extension disc #2 h and output to generator (not shown) 760 is −1800 rpm. Note the three step speed conversion from 1800 rpm+Δ at the input, identify the value of Δ and eliminate Δ at the output #2 760 which is the negative of the constant portion X of the Input 710, namely, −1800 rpm. Note that a diameter of the extension disc of the sun gear/sleeve/extension disc h exceeds a diameter of the extension disc of the sun gear/sleeve/extension disc c. Also, note that first idle gear d and second idle gear e combine to make a constant rotational speed output 760 negative or, for example, −X.

FIG. 7C shows a table of the components a through h of FIG. 7B2 versus Description 715 and Variable Input 725 where Variable Input=1800 to 3600 rpm or 2×1800 rpm and provides a further understanding of the three step conversion process (see FIG. 4) wherein the three columns of Variable Input 725 show the three calculations a through output h of the three steps 725. FIG. 7C follows the Transgear rule: C=(L+R)/2 yields R=2C−L which per FIGS. 7B1 and 7B2 yields c=2b−a and h=2f−g. The variable −Δ is identified at c; −Δ is adjusted to Δ/2 at f; and the variable Δ is eliminated at h where the input speed 725 may vary from 1800 to 3600 rpm.

FIG. 8 shows a mechanical diagram in cross-section of a spur gear Transgear Hummingbird #4D5 and is a case study #1 with a spur gear Transgear Hummingbird #4D5. FIG. 8 is a mechanical schematic drawing showing a variable input rotational speed 810 of 110.625+Δ rpm to first input shaft having a sun gear meshed with unnumbered first and second split gears to a second input shaft of a Transgear #1 820 (spur gear assembly) receiving control rotational speed from a control motor 840 (not shown) having a speed of 3540 rpm constant. The variable input is 110.625+Δ rpm where 110.625 rpm is a constant component of the variable input and Δ is a variable component driven in a river turbine by, for example, a water flow energy harnessing module (not shown). Transgear #2 830 (spur gear assembly) is coupled to an unlabeled adjustment function and to an output 850 providing a rotational speed of 885 rpm. Rotational speed in rpm follows the Transgear Rule of C=(L+R)/2. The left Transgear #1 is labeled 820 and the right Transgear #2 is labeled 830. For Transgear #1 (the left Transgear), $L_1$ (input), $C_1$ (control) and $R_1$ (output) are calculated speeds of the left sun gear, control and output of Transgear #1 where $L_1$ (Input)=8 (110.625+Δ)=885+8Δ rpm where the constant portion is 885 rpm and Δ varies with the harnessed water energy. $C_1$ (Control)=3540/16=221.5 rpm. $R_1$ (Output)=2 $C_1$-$L_1$=2 (221.5)−(885+8Δ)=−442.5−8Δ=−442.5−8Δ rpm. Regarding the second (right) Transgear #2 830, Input, Control and Output for Transgear #2 830 are calculated as follows: $L_2$ (Input)=8 (110.625+Δ)=885+8Δ rpm; $C_2$ (Control)=(−½) $R_1$=(−½) (−442.5−8Δ)=221.25+4Δ rpm; and $R_2$ (Output)=2 $C_2$-$L_2$=2 (221.25+4Δ)−(885−8Δ)=−442.5 rpm. Note that the variable Δ has been eliminated from the outputs.

Torque, power, and power ratio leading to an electrical advantage per the graph of FIG. 6E following the Transgear rule: C=(L+R)/2 will now be discussed in nine calculations to balance torque and speed and provide an electrical advantage demonstrated by calculating a PR or Power Ratio for the speed converter system of FIG. 8. Nine calculations a. through i. provide the steps for calculating Power Ratio (electrical advantage) at step i. and for balancing torque and speed again following the Transgear rule. Step a. is calculating generator power: 75 hp or (75) (0.7457)=55.9275 kW @ 885 rpm. Step b. is calculating generator torque=9.55 (W)/rpm=9.55 (55,9275 W)/885=603.511 Newton—meters @ 885 rpm. Step c. is calculating Torque at $R_2$=(2) (Generator Torque)=(2) (603.511)=1,207.0228 Newton—meters @ 442.5 rpm. Step d. is balancing torque of Transgear #2 830 by Torque $C_2$=Torque $R_2$=1,207.0228 N-m @ 221.25 rpm. Step e. is calculating Torque $R_1$=(½) $C_2$=(½) (1,207.0228)=603.5114 N-m @ 442.5 rpm. Step f. is balancing Torque in the first spur gear assembly, Transgear #1 820, by Torque $C_1$=Torque $R_1$=603.5114 N-m @ 221.25 rpm. Step g. is calculating CM (Control Motor) Torque=$C_1$/16=603.5114/16=37.7194 N-m @ 3540 rpm. Step h. is calculating CM (Control Motor) Power in Watts=(N-m) (rpm)/9.55=37.7194 (3540)/9.55=13,981.875 W @ 3540 rpm which is converted to horsepower as W/745.7=13,981.85/745.7=18.75 hp at 3540 rpm. Notice that Generator output power exceeds control motor power for an electrical advantage and step. i. is to calculate Power Ratio (PR) =Control Motor/Generator=Control Power/Output Power=18.75/75=0.25 (electrical advantage).

FIGS. 9A through 9C show that, further to the first case study for spur gear speed converter assemblies, other Transgear assemblies may be structured as Hummingbird speed converters and provide an electrical advantage to the Hummingbird 4D of FIGS. 6B, 6D except sharing a common shaft. FIG. 9A shows a spur/helical gear assembly structure of a Hummingbird speed converter. Spur gear Transgear #1 is 920-1; spur gear Transgear #2 is 930-1; Variable Input is 910-1; Control is 940-1; Output is 950-1 and an adjustment is 960-1 where the adjustment is Control #2=−⅓ Output #1 (opposite direction). FIG. 9B shows a Bevel/Miter Gear Hummingbird speed converter structure. Bevel/Miter Transgear #1 is 920-2; Bevel/Miter Transgear #2 is 930-2; Variable Input is 910-2; Control is 940-2; Output is 950-2 and an adjustment is 960-2 (gear surrounding output shaft 950-2) with, for example, the same value as that of the spur gear Hummingbird speed converter of FIG. 9A or Control #2=−⅓ Output #1. FIG. 9C shows a Ring Gear Transgear Hummingbird speed converter assembly.

Ring gear Transgear #1 is 920-3; Transgear #2 is 930-3; Variable Input is 910-3; Control is 940-3; Output is 950-3 and an adjustment gear is 960-3 (the same adjustment as FIGS. 9A and 9B). In the spur gear and bevel gear speed converter example structures the adjustment may be from 1 to −⅓ (change to opposite direction of rotation) where the ring gear Transgear of FIG. 9C may alternatively have an adjustment of 1 to ⅓ (the same direction of rotation).

FIGS. 10A through 10C show various modifications that may be made to a basic spur gear Transgear of a Hummingbird speed converter, for example, by changing gear diameter ratios. In FIG. 10A the left sun gear 1010-1 is the same diameter as the right sun gear 1020-1. In FIG. 10B, the left sun gear 1010-2 may have a larger diameter than the right sun gear 1020-2. In FIG. 10C, the right sun gear 1020-3 may have a larger diameter than the left sun gear 1010-3. There are many other variations, for example, to increase the number or diameter of planetary gears or increase the size of carrier gears.

The principles of application of the several discussed embodiments of a structure and method of constructing same for, for example, providing a green renewable energy alternative to the burning of fuel such as coal, oil or other less environmentally friendly energy sources have been demonstrated above comprising a harnessing module specially designed and located to produce at least a predetermined value of harnessed renewable energy to produce a constant amount of power to a load. A controlling module may use a pair of spur/helical gear assemblies of sun gears and planetary gears constructed as a three variable control of variable rotational speed (a Hummingbird) and an accompanying control motor or control assembly used to convert rotational harnessing module speed variation to constant frequency, for example, for use in a river or tidal MHK turbine electric power generator. The present embodiments used in conjunction with known flow energy turbine systems may be enhanced by using many known control systems for improved operation such as pitch and yaw control in wind turbines which are adaptable for use as propeller-driven river turbine harnessing modules, control responsive to power grid statistics and requirements and remote or automatic control responsive to predicted and actual weather conditions (river velocity from weather forecasts, an anemometer, water flow velocity from a water flow velocity meter, torque control via a torque meter, barometric reading and direction (rising or falling) and the like). A three variable to constant speed converter may be of the Goldfinch or preferably a simplified Hummingbird type and include a constant speed motor for controlling the output speed at a constant (constant frequency in Hertz) along with use of a variable power generator in certain of these embodiments. Besides river and tidal water energy uses, applications of a Hummingbird control may also be found in the fields of combustion or electric vehicles or boats, pumps and compressor. These and other features of embodiments and aspects of a variable energy flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A control gear assembly for controlling variable input rotational speed such that an output of the control assembly provides a constant speed output from the variable input rotational speed, the control assembly for outputting a constant value of electric frequency from a generator, the control assembly

CHARACTERIZED BY an input shaft for receiving the variable input rotational speed comprising a predetermined value X of constant rotational speed and a value Δ of variable or constant rotational speed depending on a value of the variable input rotational speed, a constant control input received from a control motor adjusted such that a generator output frequency remains at a constant frequency with increasing load on the generator, a first spur gear assembly and a second spur gear assembly, the first and second spur gear assemblies having the input shaft connecting the first and second spur gear assemblies, the connecting input shaft having a first sun gear of the first spur gear assembly and a second sun gear of the second spur gear assembly, the first spur gear assembly comprising an extension disc/sleeve/sun gear, the extension disc of the sun gear/sleeve/extension disc for receiving a constant control input rotational speed received from a control motor, the sun gear of the extension disc/sleeve/sun gear of the first spur gear assembly for meshing with a first planetary gear of first and second planetary gears of the first spur gear assembly, the first and second planetary gears meshed with each other and the second planetary gear meshed with the first sun gear of the input shaft connecting the first spur gear assembly with the second spur gear assembly, the first spur gear assembly further comprising a carrier gear and pin assembly comprising first and second pins for supporting the first and second planetary gears of the first planetary gear assembly, the second spur gear assembly comprising a sun gear/sleeve/extension disc, the extension disc of the sun gear/sleeve/extension disc for outputting a constant rotational speed to the generator, the sun gear of the sun gear/sleeve/extension disc of the second planetary gear assembly for meshing with a first planetary gear of first and second planetary gears of the second planetary gear assembly, the first and second planetary gears meshed with each other and the second planetary gear meshed with the second sun gear of the input shaft connecting the first spur gear assembly with the second spur gear assembly, the second spur gear assembly further comprising a carrier gear and pin assembly comprising first and second pins for supporting the first and second planetary gears of the second spur gear assembly, the carrier gear and pin assembly of the first spur gear assembly being attached to the carrier gear and pin assembly of the second spur gear assembly, when a generator load is zero or no load in Watts, a generator output frequency is adjusted to be a predetermined value in Hz, the control motor rotational speed is a predetermined constant value in rpm and the generator rotational speed is a predetermined value in rpm.

2. The control assembly as recited in claim 1
FURTHER CHARACTERIZED BY
when the generator load increases from zero or no load in Watts to a higher load value in Watts, a generator output frequency decreases from the predetermined value in Hz when there is no adjustment to the predetermined value of generator output frequency in Hz, the control motor rotational speed decreases from the predetermined value of control motor rotational speed in rpm when there is no adjustment to the predetermined value of generator output frequency in Hz, and the generator rotational speed decreases from the predetermined value of generator rotational speed in rpm when there is no adjustment to the predetermined value of generator output frequency in Hz.

3. The control assembly as recited in claim 1
FURTHER CHARACTERIZED BY
when the generator load increases from zero or no load in Watts to a higher load value in watts, a generator output frequency is adjusted to the predetermined value in Hz, the control motor rotational speed is adjusted to the predetermined value in rpm and, responsive to control motor rotational speed adjustment, the generator rotational speed remains at the predetermined value in rpm.

4. A control gear assembly for controlling variable input rotational speed such that an output of the control assembly provides a constant rotational speed output to a generator from the variable input rotational speed from an energy harnessing module, the control assembly for outputting a predetermined value of electric energy from a generator responsive to input power received from the energy harnessing module, the control assembly
CHARACTERIZED BY
a first input shaft for receiving the variable input rotational speed and input power from the energy harnessing module, the variable input rotational speed comprising a predetermined value X of constant rotational speed and a variable value $\Delta$ of variable rotational speed,
a first Transgear gear assembly comprising a first spur gear assembly and a second Transgear assembly comprising a second spur gear assembly, the first Transgear gear assembly having a second input shaft and the second Transgear assembly having a third input shaft, the second and third input shafts connected to the first input shaft for receiving the variable input rotational speed (X+$\Delta$ rpm) comprising the predetermined value X of constant rotational speed and the variable value $\Delta$ of variable rotational speed,
the second input shaft of the first spur gear assembly having a first sun gear of the first spur gear assembly and the third input shaft of the second spur gear assembly having a first sun gear of the second spur gear assembly, the first sun gear of the first spur gear assembly and the first sun gear of the second spur gear assembly for receiving the variable input rotational speed from the first input shaft,
a control motor shaft and gear for connecting a control motor to a carrier gear and pin assembly of the first spur gear assembly, the control motor shaft and gear for receiving a constant rotational speed input and control power from the control motor,
the carrier gear and pin assembly comprising first and second pins of the first spur gear assembly supporting first and second planetary gears of the first spur gear assembly, the first and second planetary gears meshed with each other and the second planetary gear meshed with a sun gear/sleeve/extension disc, the carrier gear and pin assembly for receiving a constant control input rotational speed from the control motor shaft and gear,
the sun gear/sleeve/extension disc of the first spur gear assembly connected to an adjustment function connected between the first and the second spur gear assemblies, the adjustment function connected to a carrier gear and pin assembly of the second spur gear assembly,
the carrier gear and pin assembly of the second spur gear assembly comprising first and second pins of the second spur gear assembly supporting first and second planetary gears of the second spur gear assembly, the first planetary gear being meshed with the first sun gear of the third input shaft of the second spur gear assembly, the first and second planetary gears of the second spur gear assembly being meshed with each other,
the first sun gear of the third input shaft of the second spur gear assembly being meshed with the first planetary gear of the second planetary gear assembly,
the second planetary gear of the second spur gear assembly being meshed with a sun gear of a sun gear/sleeve/extension disc of the second spur gear assembly, an extension disc of the sun gear/sleeve/extension disc of the second spur gear assembly being connected to an output shaft and gear for outputting a constant rotational speed to the generator,
the first sun gear of the third input shaft of the second spur gear assembly being meshed with the first planetary gear of the second planetary gear assembly,
the control assembly receiving input power from the energy harnessing module which exceeds the control power of the control motor and exceeds generator output power to a load such that, when generator output power exceeds control motor power, an electrical advantage results.

5. The control assembly as recited in claim 4
FURTHER CHARACTERIZED BY
the control motor shaft and gear outputting a constant rotational speed with increasing generator load.

6. The control assembly as recited in claim 4
FURTHER CHARACTERIZED BY
the first and second spur gear assemblies connected to one another by the adjustment function according to a spur gear Transgear assembly rule where C=carrier gear rotational speed in rpm, L=first sun gear of first spur gear assembly rotational speed in rpm and R=first sun gear of second spur gear assembly rotational speed in rpm such that C=(L+R)/2; L=2C−R and R=2C−L.

7. The control gear assembly as recited in claim 4
FURTHER CHARACTERIZED BY
the adjustment function connected between the sun gear/sleeve/extension disc of the first spur gear assembly and the carrier gear and pin assembly of the second spur gear assembly, the adjustment function converting a positive rotational speed to a negative rotational speed.

8. A control gear assembly for controlling variable input rotational speed such that an output of the control assembly provides a constant speed output from the variable input rotational speed to a generator, the control gear assembly for outputting a predetermined value of constant rotational speed
CHARACTERIZED BY
an input shaft for receiving the variable input rotational speed X+$\Delta$, where X is a constant component and $\Delta$ is a variable component of the variable input rotational speed, the input shaft having a first sun gear meshed with a carrier and pin assembly of a first spur gear assembly,
the carrier and pin assembly for supporting first and second planetary gears, the first planetary gear meshed with the first sun gear of the first spur gear assembly, the first and second planetary gears meshed with each other and the second planetary gear meshed with a sun gear/sleeve/extension disc, the sun ger/sleeve/extension disc of the first spur gear assembly meshed with a first idle gear, the first idle gear meshed with a second idle gear, the second idle gear surrounding an adjustment function, the second idle gear meshed with a carrier gear and pin assembly of the second spur gear assembly, the carrier gear and pin assembly of the second spur gear assembly for supporting first and second planetary gears of the second spur gear assembly, the first and second planetary gears being meshed with each other, the first planetary gear being meshed with a second sun gear of the input shaft for receiving the variable input rotational speed, the second planetary gear being meshed with a sun gear/sleeve/extension disc of the second spur gear assembly, the carrier gear and pin assembly of the first spur gear assembly receiving a control input, the sun gear/sleeve/extension disc of the second spur gear assembly outputting a constant rotational speed X to a generator for generating electric power such that a variable component Δ of the variable input rotational speed is eliminated, and the constant rotational speed X of the variable input rotational speed output by the sun gear/sleeve/extension disc of the second spur gear assembly becomes a constant negative rotational speed X responsive to the first idle gear and the second idle gear surrounding the adjustment function.

9. The control assembly as recited in claim 8,
FURTHER CHARACTERIZED BY
the first and second spur gear assemblies being replaced by first and second ring gear assemblies, the first and second ring gear assemblies sharing a common shaft connecting the first and second ring gear assemblies, the common shaft receiving a control input rotational speed from a control input shaft and gear and a variable input rotational speed input from an input shaft and gear, the adjustment function being connected between the first and second ring gear assemblies, and the second ring gear assembly providing a constant output rotational speed via an output shaft and gear.

10. The control assembly as recited in claim 8,
FURTHER CHARACTERIZED BY
the first and second spur gear assemblies being replaced by first and second bevel/miter gear assemblies, the first and second bevel/miter gear assemblies sharing a common shaft connecting the first and second bevel/miter gear assemblies, the common shaft receiving a control input rotational speed from a control input shaft and gear and a variable input rotational speed input from an input shaft and gear, the adjustment function being connected between the first and second bevel/miter gear assemblies, and the second bevel/miter gear assembly providing a constant output rotational speed.

11. The control gear assembly for controlling variable input rotational speed as recited in claim 8
FURTHER CHARACTERIZED BY
changing the adjustment function by one of enlarging a diameter of the extension disc of the sun gear/sleeve/extension disc of the second spur gear assembly compared with a diameter of the extension disc of the sun gear/sleeve/extension disc of the first spur gear assembly the first idle gear between the first and second spur gear assemblies.

* * * * *